United States Patent
Xu

(10) Patent No.: US 11,051,285 B2
(45) Date of Patent: Jun. 29, 2021

(54) AGGREGATION METHODS, GNODEBS, USER EQUIPMENTS AND STORAGE MEDIUM

(71) Applicant: GUANGDONG OPPO MOBILE TELECOMMUNICATIONS CORP., LTD., Guangdong (CN)

(72) Inventor: Hua Xu, Ottawa (CA)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/493,200

(22) PCT Filed: Feb. 13, 2018

(86) PCT No.: PCT/CN2018/076733
§ 371 (c)(1),
(2) Date: Sep. 11, 2019

(87) PCT Pub. No.: WO2018/166324
PCT Pub. Date: Sep. 20, 2018

(65) Prior Publication Data
US 2020/0137747 A1  Apr. 30, 2020

Related U.S. Application Data

(60) Provisional application No. 62/471,002, filed on Mar. 14, 2017.

(51) Int. Cl.
*H04W 72/04* (2009.01)
*H04W 80/08* (2009.01)
*H04W 88/06* (2009.01)

(52) U.S. Cl.
CPC ... *H04W 72/0413* (2013.01); *H04W 72/0446* (2013.01); *H04W 80/08* (2013.01); *H04W 88/06* (2013.01)

(58) Field of Classification Search
CPC ............ H04W 72/0413; H04W 72/0446
(Continued)

(56) References Cited

U.S. PATENT DOCUMENTS

2010/0303035 A1  12/2010  Gao
2018/0199376 A1*  7/2018  Kim .................... H04L 1/0001
(Continued)

FOREIGN PATENT DOCUMENTS

CN  101877911 A  11/2010
CN  104469946 A  3/2015

OTHER PUBLICATIONS

International Search Report dated May 2, 2018; PCT/CN2018/076733.
(Continued)

*Primary Examiner* — Peter G Solinsky

(57) ABSTRACT

The present disclosure relates to slot/physical resource block (PRB) aggregation methods, gNodeBs (gNB), user equipments and storage medium. A method is carried out in a gNB and includes: signaling, by a gNodeB (gNB), information on at least part of aggregation configuration of one of a set of slots, a set of physical resource blocks (PRBs) in a single slot, and a set of PRBs across at least two slots to a user equipment (UE); and receiving, by the gNB, a long format physical uplink control channel (PUCCH) carried in the one of the set of slots, the set of PRBs in a single slot, and the set of PRBs across at least two slots, which is aggregated according to the aggregation configuration, from the UE.

22 Claims, 6 Drawing Sheets

(58) Field of Classification Search
USPC .......................................................... 370/329
See application file for complete search history.

(56) References Cited

U.S. PATENT DOCUMENTS

2019/0349922 A1* 11/2019 Xu ......................... H04L 5/0053
2020/0045722 A1* 2/2020 Bae ................... H04W 72/1242

OTHER PUBLICATIONS

Written Opinion of the International Search Authority dated May 2, 2018; PCT/CN2018/076733.
Intel Corporation; "UL control channel design with long duration", 3GPP TSG-RAN WG1 #87 Reno, USA, Nov. 14-18, 2016, R1-1611995, 2 2 UL control channel with long duration in time and frequency domain.
Kazuaki Takeda ."Study on New Radio Access Technology", 3GPP TSG RAN Meeting #74, Vienna, Austria, Dec. 5-8, 2016; RP-162201, p. 37.
LG Electronics,. "Design of long duration UL control channel for NR," R1-1611844, 3GPP TSG RAN WG1 Meeting #87, Reno, USA Nov. 14-18, 2016, 2 Design of long duration NR-PUCCH type.
Ericsson,. "On long UCI with simultaneous data transmission," R1-1612918, Nov. 14-18, 2016, the whole document.
First Office Action of the European application No. 18768325.5, dated Aug. 18, 2020.
Second Office Action of the Taiwanese application No. 107108614, dated Jul. 16, 2020.
Huawei et al. "WF on multiple slots design for PUCCH in long duration", 3GPP TSG-RAN WG1 Meeting #88 R1-1703861, Feb. 16, 2017.
First Office Action of the Chilean application No. 201902619, dated Aug. 28, 2020.
Intel Corporation: "UL control channel design with long duration", 3GPP Draft; R1-1700368 Intel NR PUCCH Long Duration, 3rd Generation Partnership Project (3GPP), vol. RAN WG1, No. Spokane, USA; Jan. 16, 2017-Jan. 20, 2017 Jan. 16, 2017 (Jan. 16, 2017), XP051207905, Retrieved from the Internet: URL:http://www.3gpp.org/ftp/Meetings_3GPP_SYNC/RAN1/Docs/ [retrieved on Jan. 16, 2017] * Section 4; p. 4.
Catt: "Long PUCCH structure", 3GPP Draft; R1-1700198, 3rd Generation Partnership Project (3GPP), vol. RAN WG1, No. Spokane, USA; Jan. 16, 2017-Jan. 20, 2017 Jan. 16, 2017 (Jan. 16, 2017), XP051207738, Retrieved from the Internet: URL:http://www.3gpp.org/ftp/Meetings_3GPP_SYNC/RAN1/Docs/ [retrieved on Jan. 16, 2017]* Section 2; p. 1.
Guangdong Oppo Mobile Telecom: "Slot aggregation and configuration for NR long PUCCH", 3GPP Draft; R1-1704623, 3rd Generation Partnership Project (3GPP), vol. RAN WG1, No. Spokane, Washington, USA; Apr. 3, 2017-Apr. 7, 2017 Mar. 24, 2017 (Mar. 24, 2017), XP051250536, Retrieved from the Internet: URL:http://www.3gpp.org/ftp/tsg_ran/WG1_RL1/TSGR1_88b/Docs/ [retrieved on Mar. 24, 2017]* the whole document.
Intel Corporation: "on slot aggregation for data transmission" , 3GPP TSG RAN WG1 Meeting #88, R1-1702239, Athens, Greece, Feb. 13-17, 2017 (Feb. 13-17, 2017) ; ( http://www.3gpp.org/ftp/tsg_ran/WG1_RL1/TSGR1_88/Docs/R1-1702239.zip) Description Section 2.1~2.3.
Guangdong OPPO Mobile Telecom: "Design of NR PUCCH with long duration", 3GPP TSG RAN WG1 meeting #88, R1-1701957, Athens, Greece Feb. 13-17, 2017 (Feb. 13-17, 2017);(http://www.3gpp.org/ftp/tsg_ran/WG1_RL1/TSGR1_88/Docs/R1-1701957.zip) Description Section 1, 2.1, 2.2.
Supplementary European Search Report in the European application No. 18768325.5, dated Jan. 27, 2020.
First Office Action of the Taiwanese application No. 107108614, dated Feb. 11, 2020.
First Office Action of the Chinese application No. 201911304015.6, dated Nov. 3, 2020.
First Office Action of the Canadian application No. 3055455, dated Oct. 22, 2020.
Office Action of the Indian application No. 201917038896, dated Jan. 18, 2021.
Written Opinion of the Singaporean application No. 11201908335Y, dated Jan. 22, 2021.
Second Office Action of the Chilean application No. 201902619, dated Feb. 1, 2021.

* cited by examiner

AGGREGATION METHODS, GNODEBS, USER EQUIPMENTS AND STORAGE MEDIUM

CROSS-REFERENCE TO RELATED APPLICATIONS

This patent application claims the priority of the U.S. Provisional Application No. 62/471,002, entitled "Slot Aggregation design and configuration for NR PUCCH with Long Duration," filed on Mar. 14, 2017, which is hereby incorporated by reference herein in its entirety.

TECHNICAL FIELD

The present disclosure generally relates to the field of communications, and in particular, to slot/physical resource block (PRB) aggregation methods, gNodeBs (gNBs), user equipments (UEs) and storage medium.

BACKGROUND

In 5th Generation New Radio (5G NR) system, some new design requirements emerge. For example, a slot may be split into uplink and downlink portions. The downlink portion consists of one or several symbols and may be transmitted from gNB, which is similar to eNodeB (eNB) in the 4th Generation Long term evolution (LTE), to the UEs at the beginning of the slot. The downlink portion may be followed by a switching period (or a guard period (GP)) where the UEs complete the switching from downlink reception to uplink transmission. The switching period is followed by an uplink portion where UEs transmit one or several symbols in uplink. This new structure may make the turnaround time less than that of LTE and thus achieve the goal of low latency for NR system. However, as uplink symbols in such slots are less than that of a full uplink slot where all the symbols are for uplink transmission, it may impose some challenges in other aspects of the system design, for example, the physical uplink control channel (PUCCH) coverage.

The information disclosed in the background is only configured to enhance an understanding to the background of the present disclosure, and thus may include information not forming a conventional art known by those skilled in the art.

SUMMARY

In order to solve the problem in related technology, the present disclosure provides slot/PRB aggregation methods, gNBs, UEs and storage medium, which may achieve at least the same coverage of PUCCH as compared with LTE.

According to a first aspect of the disclosure, there is provided a method, including: signaling, by a gNB, information on at least part of aggregation configuration of one of a set of slots, a set of PRBs in a single slot, and a set of PRBs across at least two slots to a UE; and receiving, by the gNB, a long format PUCCH carried in the one of the set of slots, the set of PRBs in a single slot, and the set of PRBs across at least two slots, which is aggregated according to the aggregation configuration, from the UE.

According to a second aspect of the disclosure, there is provided a method, including: receiving, by a UE, information on at least part of aggregation configuration of one of a set of slots, a set of PRBs in a single slot, and a set of PRBs across at least two slots from a gNB; aggregating, by the UE, the one of the set of slots, the set of PRBs in a single slot, and the set of PRBs across at least two slots according to the aggregation configuration; and sending, by the UE, a long format PUCCH to the gNB via the aggregated one of the set of slots, the set of PRBs in a single slot, and set of PRBs across at least two slots.

According to a third aspect of the disclosure, there is provided a gNB, including: at least one computer readable memory storing computer program instructions; and at least one processor. The computer program instructions, when executed by the at least one processor, cause the gNB to: signal information on at least part of aggregation configuration of one of a set of slots, a set of PRBs in a single slot, and a set of PRBs across at least two slots to a UE; and receiving a long format PUCCH carried in the one of the set of slots, the set of PRBs in a single slot, and the set of PRBs across at least two slots, which is aggregated according to the aggregation configuration, from the UE.

According to a fourth aspect of the disclosure, there is provided a UE, including: at least one computer readable memory storing computer program instructions; and at least one processor. The computer program instructions, when executed by the at least one processor, cause the UE to: receive information on at least part of aggregation configuration of one of a set of slots, a set of PRBs in a single slot, and a set of PRBs across at least two slots from a gNB; aggregate the one of the set of slots, the set of PRBs in a single slot, and the set of PRBs across at least two slots according to the aggregation configuration; and send a long format PUCCH to the gNB via the aggregated one of the set of slots, the set of PRBs in a single slot, and the set of PRBs across at least two slots.

According to a fifth aspect of the disclosure, there is provided a gNB, including: a signaling module configured to signal information on at least part of aggregation configuration of one of a set of slots, a set of PRBs in a single slot, and a set of PRBs across at least two slots to a UE; and an obtaining module configured to receiving a long format PUCCH carried in the one of the set of slots, the set of PRBs in a single slot, and the set of PRBs across at least two slots, which is aggregated according to the aggregation configuration, from the UE.

According to a sixth aspect of the disclosure, there is provided a UE, including: an obtaining module configured to receive information on at least part of aggregation configuration of one of a set of slots, a set of PRBs in a single slot, and a set of PRBs across at least two slots from a gNB; an aggregating module configured to aggregate the one of the set of slots, the set of PRBs in a single slot, and the set of PRBs across at least two slots according to the aggregation configuration; and a sending module configured to send a long format PUCCH to the gNB via the aggregated one of the set of slots, the set of PRBs in a single slot, and the set of PRBs across at least two slots.

According to a seventh aspect of the disclosure, there is provided a non-transitory computer-readable storage medium having stored thereon instructions, that when executed by a processor, cause the processor to perform the method, as described above, carried out in the gNB.

According to an eighth aspect of the disclosure, there is provided a non-transitory computer-readable storage medium having stored thereon instructions, that when executed by a processor, cause the processor to perform the method, as described above, carried out in the UE.

The technical solutions provided in the above aspects of the present disclosure may achieve the following beneficial effects. According to some embodiments of the present disclosure, the gNB signals information on at least part of aggregation configuration of one of a set of slots, a set of PRBs in a single slot, and a set of PRBs across at least two slots to a UE, and then the gNB receives from the UE a long format PUCCH carried in the one of the set of slots, the set of PRBs in a single slot, and the set of PRBs across at least two slots, which is aggregated according to the aggregation configuration. As such, the aggregation method may achieve at least the same coverage of PUCCH as compared with LTE.

According to a ninth aspect of the disclosure, there is provided an aggregation method, including: obtaining, by UE, information on at least one of: a total number of slots to be aggregated for carrying uplink control information (UCI), and a structure of each slot; aggregating, by the UE, a plurality of slots according to the information on the at least one of the total number of slots to be aggregated and the structure of each slot; and sending, by the UE, PUCCH to a gNB via the aggregated slots.

According to a tenth aspect of the disclosure, there is provided an aggregation method, including: signaling, by a gNB, information on at least one of: a total number of slots to be aggregated for carrying UCI, and a structure of each slot to UE; and receiving, by the gNB, PUCCH from the UE via a plurality of slots aggregated according to the information on the at least one of the total number of slots to be aggregated and the structure of each slot.

According to an eleventh aspect of the disclosure, there is provided UE, including: an obtaining module configured to obtain information on at least one of a total number of slots to be aggregated for carrying UCI, and a structure of each slot; an aggregating module configured to aggregate a plurality of slots according to the information on the at least one of the total number of slots to be aggregated and the structure of each slot; and a sending module configured to send PUCCH to a gNB via the aggregated slots.

According to a twelfth aspect of the disclosure, there is provided a gNB, including: a signaling module configured to signal information on at least one of: a total number of slots to be aggregated for carrying UCI, and a structure of each slot to UE; and an obtaining module configured to receive PUCCH from the UE via a plurality of slots aggregated according to the information on the at least one of the total number of slots to be aggregated and the structure of each slot.

According to a thirteenth aspect of disclosure, there is provided a non-transitory computer-readable storage medium having stored thereon instructions, that when executed by a processor, cause the processor to perform the aggregation method according to the ninth aspect.

According to a fourteenth aspect of disclosure, there is provided a non-transitory computer-readable storage medium having stored thereon instructions, that when executed by a processor, cause the processor to perform the aggregation method according to the tenth aspect.

The technical solutions provided in the ninth to fourteenth aspects of the present disclosure may achieve the following beneficial effects. According to some embodiments of the present disclosure, a UE obtains information on at least one of: a total number of slots to be aggregated for carrying UCI, and a structure of each slot; the UE aggregates a plurality of slots according to the information on the at least one of the total number of slots to be aggregated and the structure of each slot; and the UE sends PUCCH to a gNB via the aggregated slots. As such, the aggregation method may achieve at least the same coverage of PUCCH as compared with LTE.

It is to be understood that the above general descriptions and detailed descriptions below are only exemplary and explanatory and not intended to limit the present disclosure.

BRIEF DESCRIPTION OF DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Figure 1A:
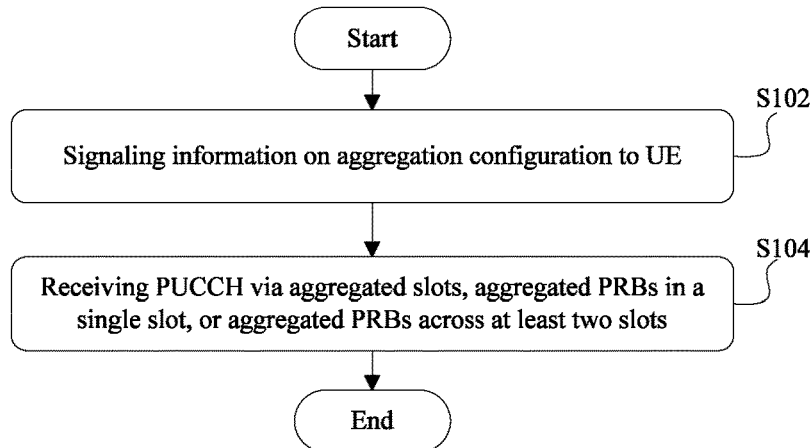
FIG. 1A is a flow chart illustrating an aggregation method performed carried out in a gNB according to an embodiment of the present disclosure.

Exemplary implementation modes will now be described more comprehensively with reference to the accompanying drawings. However, the exemplary implementation modes may be implemented in various forms, but should not be understood to be limited to examples elaborated herein; and instead, providing these implementation modes enables the present disclosure to convey the concept of the exemplary implementation modes to those skilled in the art more comprehensively and completely. The accompanying drawings only schematic diagrammatize the present disclosure, and may not be drawn to scale. The same accompanying drawing reference signs in the drawings represent the same or similar parts, so that repeated descriptions about them are eliminated.

In addition, the described characteristics, structures or features may be combined to one or more implementation modes in any proper manner. In descriptions made below, many specific details are provided for completely understanding the implementation modes of the present disclosure. However, those skilled in the art realize that the technical solutions of the present disclosure may be practiced with one or more of the specified details eliminated, or another method, component, device, operation and the like may be adopted. Under other conditions, a known structure, method, device, implementation, material or operation is not shown or described in detail so as to avoid distraction and obscuring of each aspect of the present disclosure.

Some block diagrams shown in the accompanying drawings are functional entities, and are not required to physically or logically correspond to independent entities. These functional entities may be implemented in a software form, or these functional entities may be implemented in one or more hardware modules or integrated circuits, or these functional entities may be implemented in different networks and/or processor devices and/or microcontroller devices.

In the 4th Generation Long term evolution (4G LTE) system, PUCCH is used to carry UCI from a UE to a base station called eNodeB (eNB). The UCI includes Ack/Nack for the downlink physical downlink shared channel (PDSCH) transmission, the channel state information (CSI) measured by a UE, and scheduling request (SR). The PUCCH may be transmitted in assigned physical resource blocks (PRBs) which are located at the edges of the bandwidth. The UCI may also be carried by the physical uplink shared channel (PUSCH) along with the uplink data.

To achieve at least the same coverage of PUCCH as compared with LTE, 5G NR introduces PUCCH with long duration (or PUCCH with long format, or simply long PUCCH, and hereinafter referred to as long format PUCCH) which targets the same or better coverage of PUCCH as that of LTE. Since the uplink symbols in some slots in 5G NR may be less than that in LTE, how to achieve the same or better coverage of PUCCH brings up some challenges. Slot aggregation is one way to overcome this. Slot aggregation is to aggregate multiple slots for carrying long format PUCCH so as to reach the same or better coverage as that of LTE.

FIG. 1A is a flow chart illustrating an aggregation method performed carried out in a gNB according to an embodiment of the present disclosure. The method comprises the following operations.

In block S102, the gNB signals information on at least part of aggregation configuration of one of a set of slots, a set of PRBs in a single slot, and a set of PRBs across at least two slots to a UE.

In block S104, the gNB receives from the UE a long format PUCCH carried in the one of the set of slots, the set of PRBs in a single slot, and the set of PRBs across at least two slots, which is aggregated according to the aggregation configuration.

The aggregation configuration may be about one of a set of slots, a set of PRBs in a single slot, and a set of PRBs across at least two slots.

Figure 1B:
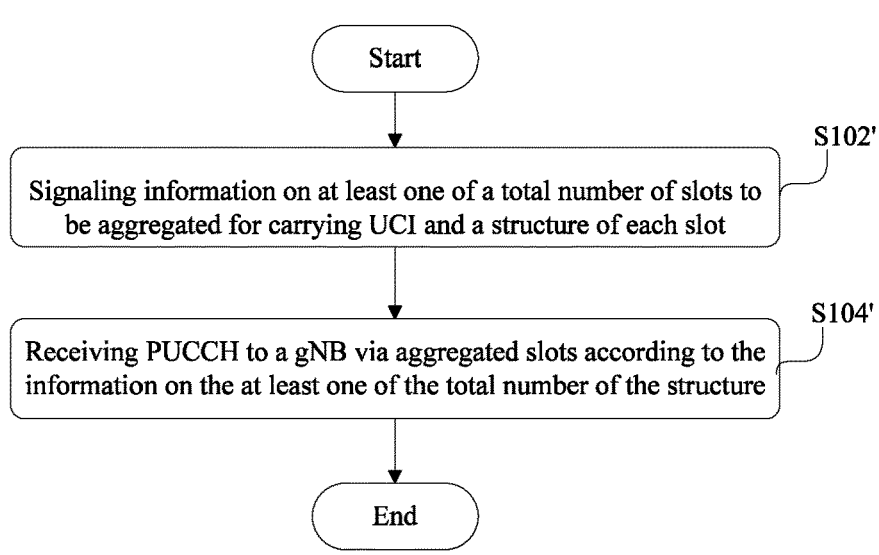
FIG. 1B is a flow chart illustrating an aggregation method carried out in a gNB according to an embodiment of the present disclosure.

In an embodiment, the aggregation configuration may be of a set of slots. FIG. 1B is a flow chart illustrating an aggregation method carried out in a gNB according to an embodiment of the present disclosure in case where the aggregation configuration is of a set of slots. Specifically, the aggregation configuration may include at least one of a total number of slots to be aggregated for carrying UCI, and a structure of each slot.

As illustrated in FIG. 1B, the aggregation method may include the following operations.

In block S102', the gNB may signal information on at least one of: a total number of slots to be aggregated for carrying UCI, and a structure of each slot to UE.

In block S104', the gNB may receive PUCCH from the UE via a plurality of slots aggregated according to the information on the at least one of the total number of slots to be aggregated and the structure of each slot. In an embodiment, the PUCCH may be long format PUCCH. Alternatively, the PUCCH may be not long format PUCCH.

In an embodiment, the gNB may further signals information on the first slot of the slots to be aggregated. In such case, the plurality of slots may be aggregated according to the information on the at least one of the total number of slots to be aggregated, the structure of each slot, and the information on the first slot of the slots to be aggregated.

In an embodiment, the gNB may receive PUCCH from the UE via aggregated slots which are aggregated by aggregating a plurality of slots by aggregating one or more PRBs of each slot. In an embodiment, the one or more PRBs may be positioned in a same manner in the slots. For example, three slots are aggregated, and each slot has four PRBs to be aggregated, and the four PRBs are arranged in the same manner in each slot. Specifically, for example, in each of the three slots, the four PRBs may include the $2_{nd}$, $3^{rd}$, $4^{th}$, $6^{th}$ PRBs. In another embodiment, the one or more PRBs may be positioned in different manners in the slots. For example, three slots are aggregated, and some PRBs of each slot may be aggregated. For example, the $1^{st}$, $2^{nd}$ and $3^{rd}$ PRBs in a first slot of the three slots may be aggregated, the $2^{nd}$ and $4^{th}$ PRBs in a second slot of the three slots may be aggregated, and the $5^{th}$ and $6^{th}$ PRBs in a third slot of the three slots may be aggregated. It will be understood that the above are only examples, more or less than three may be aggregated, and more or less PRBs may be aggregated for each slot.

In an embodiment, when the long format PUCCH supports 1 PRB×N symbols time-frequency resources for carrying UCI, the plurality of slots may be aggregated to support about 1 PRB×N symbols time-frequency resources for carrying UCI, where N is a positive integer.

Alternatively, the aggregation configuration may be of a set of PRBs in a single slot or of a set of PRBs across at least two slots (e.g. two slots, three slots, or the like). A set of PRBs in a single slot is intended to means that two or more PRBs (e.g. two PRBs, three PRBs, or the like) are in the same slot.

A set of PRBs across at least two slots is intended to means that two or more PRBs are distributed in two or more slots. For example, the set of PRBs across at least two slots totally includes 4 PRBs, and the 4 PRBs are distributed in 3 slots. Specifically, 1 PRB is located in a first slot of the 3 slots, and 2 PRBs are located in a second slot of the 3 slots, and 1 PRB is located in a third slot of the 3 slots. However, it is to be understood that the total number of the PRBs and the total number of the slots are provided as examples, and the total number of the PRBs and the total number of the slots may be configured in another manner as desired, and the total number of PRB in each slot also may be configured in another manner as desired.

At least part of aggregation configuration is intended to means entire aggregation configuration or only a part of aggregation configuration.

In an embodiment, information on at least part of aggregation configuration may be intended to refer to at least part of aggregation configuration per se.

In such a case, when a set of slots is aggregated for carrying the long format PUCCH, the gNB may signal in block S102 at least one of the total number of slots to be aggregated, structure of each slot to be aggregated, and total number of symbols to be aggregated for carrying UCI to the UE. In a preferred embodiment, the gNB may signal in block S102 the total number of slots to be aggregated and the total number of symbols to be aggregated for carrying UCI to the UE, and the structure of each slot to be aggregated may be signaled to the UE via a common control channel.

Alternatively, the gNB may signal in block S102 the total number of slots to be aggregated to the UE. In such a case, both the structure of each slot to be aggregated and total number of symbols to be aggregated for carrying UCI may be pre-configured in the UE, or signaled to the UE via a higher layer signaling, or one of the structure of each slot to be aggregated and total number of symbols to be aggregated may be pre-configured in the UE or signaled to the UE, and the other one may be derived by the UE.

When a set of PRBs in a single slot is aggregated for carrying the long format PUCCH, in block S102, the gNB may signal at least one of the total number of PRBs to be aggregated in the single slot, location of each of PRBs to be aggregated in the single slot, and total number of symbols to be aggregated for carrying UCI to the UE. Similar to the case where the a set of slots is aggregated for carrying the long format PUCCH, the gNB may signal all of the total number of PRBs to be aggregated in the single slot, location of each of PRBs to be aggregated in the single slot, and total number of symbols to be aggregated for carrying UCI to the UE, or signal a part of the total number of PRBs to be aggregated in the single slot, location of each of PRBs to be aggregated in the single slot, and total number of symbols to be aggregated for carrying UCI to the UE. For example, the gNB may signal the total number of PRBs to be aggregated in a single slot, total number of symbols to be aggregated for carrying UCI to the UE, and the location of each of PRBs to be aggregated may be signaled to the UE via a higher signaling or pre-configured in the UE or derived by the UE.

When a set of PRBs across at least two slots is aggregated for carrying the long format PUCCH, in block S102, the gNB may signal information of at least one of the total number of slots to be aggregated, structure of each slot to be aggregated, the total number of PRBs to be aggregated in each slot, location of each of PRBs to be aggregated in each slot, and total number of symbols to be aggregated for carrying UCI to the UE.

Similar to the case where the a set of slots is aggregated for carrying the long format PUCCH, the gNB may signal all of the total number of slots to be aggregated, structure of each slot to be aggregated, the total number of PRBs to be aggregated in each slot, location of each of PRBs to be aggregated in each slot, and total number of symbols to be aggregated for carrying UCI to the UE, or signal a part of the total number of slots to be aggregated, structure of each slot to be aggregated, the total number of PRBs to be aggregated in each slot, location of each of PRBs to be aggregated in each slot, and total number of symbols to be aggregated for carrying UCI to the UE, the remaining part may be signaled to the UE via a higher signaling or pre-configured in the UE or derived by the UE.

Alternatively, information on at least part of aggregation configuration may be intended to refer to a signal, such as code, bit, or the like, associated with at least part of aggregation configuration. For example, the information on at least part of aggregation configuration may be an index of a look-up table to the UE. Here, the look-up table may be pre-configured in the UE or sent to the UE via signaling of a higher layer and may contain aggregation configurations and their respective indices. In such case, in block S102, the gNB may signal the index of the look-up table to the UE. Accordingly, the index is received by the UE, the UE may look up the look-up table, which is pre-configured in the UE or sent to the UE via signaling of a higher layer and contains aggregation configurations and their respective indices. Then, the UE can obtain a corresponding aggregation configuration according to the index.

When the information on at least part of aggregation configuration is about a set of slots, the gNB receives in block S104 from the UE a long format PUCCH carried in the set of slots which is aggregated by the UE according to the aggregation configuration. When the information on at least part of aggregation configuration is about a set of PRBs in a single slot, the gNB receives in block S104 from the UE a long format PUCCH carried in the set of PRBs in a single slot, which is aggregated by the UE according to the aggregation configuration. When the information on at least part of aggregation configuration is about a set of PRBs across at least two slots, the gNB receives in block S104 from the UE a long format PUCCH carried in the set of PRBs across at least two slots, which is aggregated by the UE according to the aggregation configuration.

As described above, the long format PUCCH refers to the PUCCH with long duration (or PUCCH with long format, or simply long PUCCH) in 5G NR.

In block S102, the gNB may signal information on at least part of aggregation configuration of one of a set of slots, a set of PRBs in a single slot, and a set of PRBs across at least two slots to a UE dynamically via lower layer signaling, semi-statically via combination of higher layer signaling, or via a combination of lower layer signaling and higher layer signaling.

In other words, the signaling may be either of higher layer signaling or lower layer of signaling or combination of both. Some of such information like slot structure may also be conveyed through common channels such as common control channel. Some of the information may be pre-configured in a UE or may be implicitly derived by a UE. Such slot aggregation combinations for long PUCCH may be configured and signaled to UE. As the slot structures allocated in the system may be determined more dynamically, such configuration of slot aggregation may be signaled dynamically, for example, using DCI. Alternatively, if the slot formats may be allocated in a more semi-static way, such slot aggregation configuration may also be signaled semi-statically by using higher layer signals.

When the long format PUCCH supports 1 PRB×N symbols time-frequency resources for carrying UCI, the one of the set of slots, the set of PRBs in a single slot, and the set of PRBs across at least two slots may be aggregated to support about 1 PRB×N symbols time-frequency resources for carrying UCI, where N is a positive integer.

Specifically, when a set of slots is aggregated, the aggregated set of slots may support about 1 PRBZ×N symbols time-frequency resources for carrying UCI. When a set of PRBs in a single slot is aggregated, the aggregated set of slots may support about 1 PRB×N symbols time-frequency resources for carrying UCI. When a set of slots is aggregated, the aggregated set of PRBs across at least two slots may support about 1 PRB×N symbols time-frequency resources for carrying UCI.

Here, N may vary depending on long format PUCCH.

Similar to LTE, a couple of PUCCH formats may be defined in 5G NR. Each of the defined PUCCH formats may carry different type of UCI and have different payload. For example, a first long format PUCCH (hereafter also referred to as NR PUCCH of format 1) similar as PUCCH format 1/1a/1b in LTE may be defined which may carry 1-2 bits of Ack/Nack for downlink PDSCH transmission. In LTE, PUCCH format 1/1a/1b is transmitted in a subframe of 14 symbols, in which 6 symbols of 14 symbols are used to carry RS, and 8 symbols of the 14 symbols are used to carry UCI (specifically, Ack/Nack). To match that, the NR PUCCH of format 1 supports about 8 symbols for carrying UCI.

In addition to the NR PUCCH of format 1, other types of PUCCH formats also need to be supported which may carry more payload than 1-2 bits. For example, a NR PUCCH of format 2 may be defined which may carry a payload of about 20 coded bits. The content of the NR PUCCH of format 2 may include Ack/Nack for multiple codewords and/or other types of UCI such as CSI. For LTE PUCCH format 1/1a/1b, 10 symbols are used to carry UCI and 4 symbols are used to carry RS. Therefore, to match that, the NR PUCCH of format 2 supports about 10 symbols for carrying UCI.

When the long format PUCCH is NR PUCCH of format 1, N may be 8, and when the long format PUCCH is NR PUCCH of format 2, N may be 10. It is to be understood that the long format PUCCH may be another long format PUCCH, and accordingly, N may be another value at least partially depending on the long format PUCCH.

Various embodiments will be provided below with reference to FIGS. 2-7.

Figure 2:
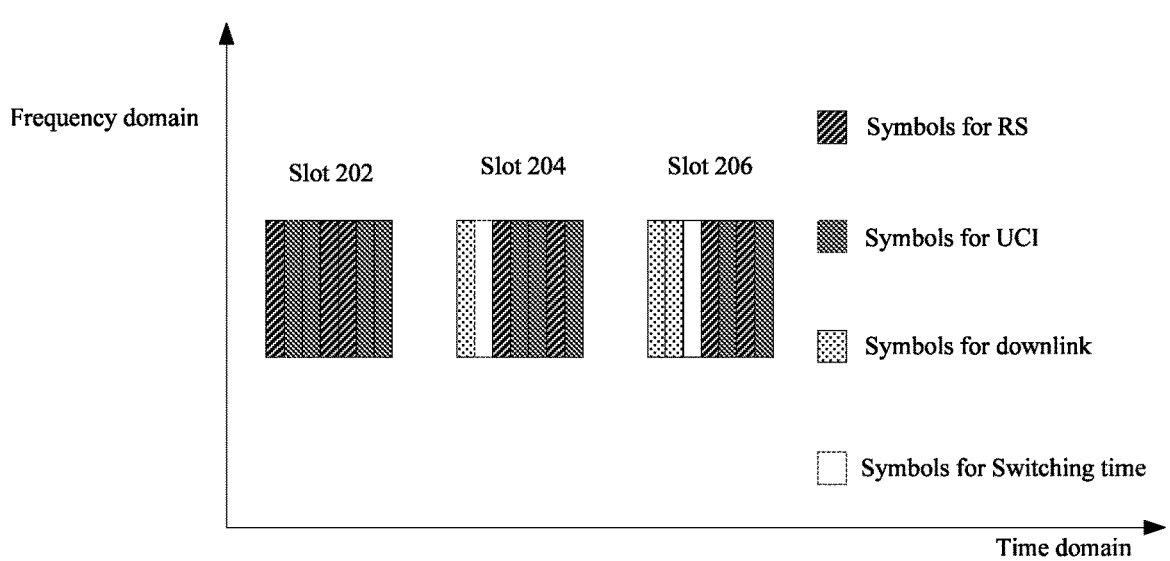
FIG. 2 is a schematic view illustrating structures of several slots for carrying long format PUCCH according to an embodiment.

FIG. 2 is a schematic view illustrating structures of several slots for carrying long format PUCCH according to an embodiment. In the embodiment shown in FIG. 2, the following description is made with respect to the NR PUCCH of format 1. It is to be understood, NR PUCCH of format 1 is used as an example, and the slots shown in FIG. 2 may be aggregated for any other long format PUCCH.

As shown in FIG. 2, there are three slots, i.e., slot 202, slot 204 and slot 206. Each of slots 202, 204 and 206 has a different structure.

In each of slots 202, 204 and 206, the rectangle with oblique lines represents a symbol for carrying RS, the gray color rectangle represents a symbol for carrying UCI, the rectangle with dots represents a symbol for carrying downlink, and the white color rectangle represents a symbol for switching period. This description about the rectangles will also apply to FIGS. 3-7.

As described above, during the switching period (or GP), a UE completes switching from downlink reception to uplink transmission.

Slot 202 includes 3 symbols for carrying RS and 4 symbols for carrying UCI. Slot 204 includes 1 symbol for carrying downlink, 1 symbol for switching period, 3 symbols for carrying UCI and 2 symbols for carrying RS. Slot 206 include 2 symbols for carrying downlink, 1 symbol for switching period, 2 symbols for carrying UCI and 2 symbols for carrying RS. However, it can be understood that the above numbers are only examples, and other structures of slots may be adopted.

For the convenience, the long format PUCCH carried in the slot structures as shown in FIG. 2 are summarized in Table 1. In Table 1, parameters include slot No., total number of available uplink symbols for long format PUCCH, number of symbols for RS and number of symbols for UCI.

TABLE 1

| Slot No. | Total number of available uplink symbols | Number of symbols for RS | Number of symbols for UCI |
|---|---|---|---|
| 202 | 7 | 3 | 4 |
| 204 | 5 | 2 | 3 |
| 206 | 4 | 2 | 2 |

As described above, in LTE, PUCCH format 1/1a/1b is transmitted in a subframe of 14 symbols, in which 6 symbols are used to carry RS, and 8 symbols are used to carry UCI (specifically, Ack/Nack). To match that, the NR PUCCH of format 1 needs to support about 8 symbols for carrying UCI.

Specifically, as coverage is one of the targets for using a long format PUCCH, for example, Discrete Fourier Transform Spread Orthogonal Frequency Division Multiplexed (DFT-S-OFDM) waveform may be used which will have lower peak-to-average-power-ratio/cubic metric (PAPR/CM) and therefore requires less power back-off at UE side. For this PUCCH format, Binary Phase Shift Keying (BPSK)/Quadrature Phase Shift Keying (QPSK) modulation may be used to generate one modulated symbol (for 1-2 bits). The modulated symbols may be spread by orthogonal or quasi-orthogonal sequences of length 12 and mapped along frequency onto a symbol in a PRB. Multiple Ack/Nack bits may be multiplexed on the same symbol using different orthogonal or quasi-orthogonal sequences. The spread sequences may be repeated across different symbols in a slot to support power boosting and improve the spreading gains, which in the end may lead to improved coverage of PUCCH. As different slot may have different number of uplink symbols, it may be hard to apply spreading further in time direction using orthogonal cover code (OCC). One reason may be the total number of uplink symbol for UCI in one slot may be an odd number. The other reason is when using slot aggregation, the uplink symbols in different slots may vary and therefore may not support the same number of PUCCH multiplexing. However, the aggregation method according to an embodiment of the present disclosure can solve the problem.

As can be seen from FIG. 2, the total number of uplink symbols in different slot structures may vary. Different slot combination may be considered in slot aggregation for the NR PUCCH of format 1. Table 2 shows some aggregation configuration examples of slots 202, 204 and 206 for NR PUCCH of format 1.

TABLE 2

| Index of slot aggregation configuration | Slot aggregation (value is the total number of uplink symbols of the slot and is used to indicate the slot structure in the aggregation) | Total number of uplink symbols for UCI |
|---|---|---|
| 1 | 7 + 7 | 4 + 4 = 8 |
| 2 | 7 + 5 | 4 + 3 = 7 |
| 3 | 7 + 5 + 4 | 4 + 3 + 2 = 9 |
| 4 | 7 + 4 + 4 | 4 + 2 + 2 = 8 |
| 5 | 5 + 5 + 5 | 3 + 3 + 3 = 9 |

TABLE 2-continued

| Index of slot aggregation configuration | Slot aggregation (value is the total number of uplink symbols of the slot and is used to indicate the slot structure in the aggregation) | Total number of uplink symbols for UCI |
| --- | --- | --- |
| 6 | 5 + 5 + 4 | 3 + 3 + 2 = 8 |
| 7 | 5 + 4 + 4 | 3 + 2 + 2 = 7 |
| 8 | 7 + 5 + 4 + 4 | 4 + 3 + 2 + 2 = 11 |
| 9 | 7 + 4 + 4 + 4 | 4 + 2 + 2 + 2 = 10 |
| 10 | 5 + 5 + 4 + 4 | 3 + 3 + 2 + 2 = 10 |
| 11 | 5 + 4 + 4 + 4 | 3 + 2 + 2 + 2 = 9 |
| 12 | 4 + 4 + 4 + 4 | 2 + 2 + 2 + 2 = 8 |

As show in Table 2, for index 1 of slot aggregation configuration, 7+7 as shown in the second column means that two slots 202 are aggregated, and each of the two slots includes 4 symbols for UCI, and thus total number of uplink symbols for UCI is 4+4=8 as shown in the third column. For index 2 of slot aggregation configuration, 7+5 as shown in the second column means that slot 202 and slot 204 are aggregated, and slot 202 includes 4 symbols for UCI and slot 204 includes 3 symbols for UCI, and thus total number of uplink symbols for UCI is 4+3=7 as shown in the third column. Similar description may be applied to each of the indices 3-12 of slot aggregation configuration, and thus detailed description on these indices of slot aggregation configuration is omitted. From Table 2, it can be observed that total number of uplink symbols for UCI may range from 7 to 11, which is close to 8 as used in the PUCCH format 1/1a/1b of LTE. As such, the aggregation method according to the embodiment of the present disclosure can support about the same number of UCI as that in LTE PUCCH format 1/1a/1b.

It is to be noted that the aggregation configurations shown in Table 2 are only examples and actual aggregation configuration is not limited to the aggregation configurations shown in Table 2, and that the two or more of slots 202-206 may aggregated in another way, as long as the total number of uplink symbols for UCI can support about enough (e.g, 8 in case of NR PUCCH of format 1) symbols for UCI.

Figure 3:
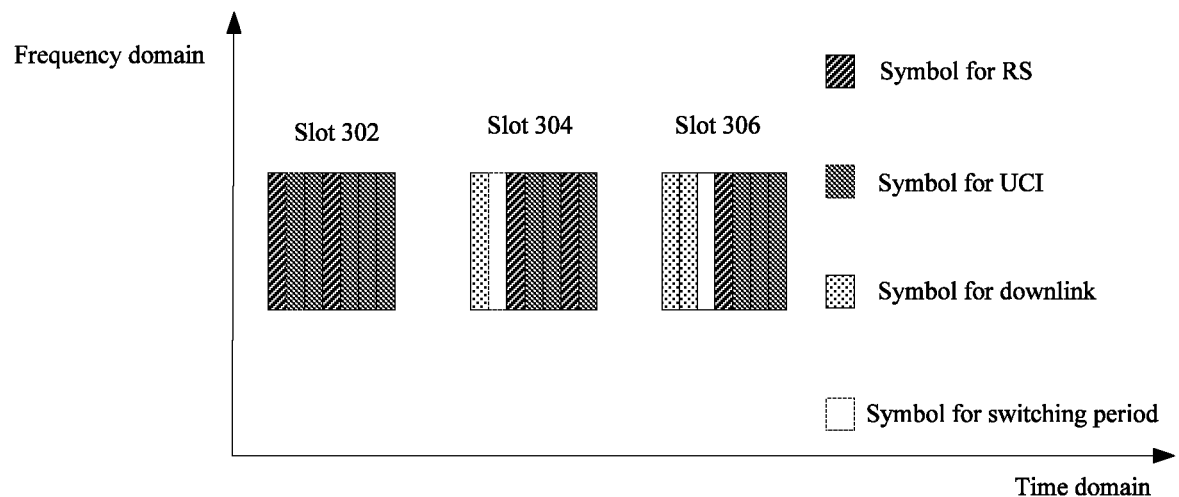
FIG. 3 is a schematic view illustrating structures of several slots for carrying long format PUCCH according to another embodiment.

FIG. 3 is a schematic view illustrating structures of several slots for carrying long format PUCCH according to another embodiment. As shown in FIG. 3, in the set of slots, there are fewer symbols for RS while more symbols for UCI compared to the set of slots shown in FIG. 2. In the embodiment shown in FIG. 3, the following description is made with respect to the NR PUCCH of format 1 and the NR PUCCH of format 2. It is to be understood, the NR PUCCH of format 1 and the NR PUCCH of format 2 are taken as examples, and the slots shown in FIG. 3 may be aggregated for other long format PUCCH.

As shown in FIG. 3, there are three slots, i.e., slot 302, slot 304, and slot 306. In each of slots 302, 304 and 306, the rectangle with oblique lines represents a symbol for carrying RS, the gray color rectangle represents a symbol for carrying UCI, the rectangle with dots represents a symbol for carrying downlink, and the white color rectangle represents a symbol for switching period. Slot 302 includes 5 symbols for carrying UCI, and 2 symbols for carrying RS. Slot 304 includes 1 symbol for carrying downlink, 1 symbol for switching period, 3 symbols for carrying UCI and 2 symbols for carrying RS. Slot 306 include 2 symbols for carrying downlink, 1 symbol for switching period, 3 symbols for carrying UCI and 1 symbol for carrying RS. However, it is to be understood that the above numbers are only examples, and other structures of slots may be adopted.

For the convenience, the long format PUCCH carried in the slot structures as shown in FIG. 2 are summarized in Table 3. In Table 3, parameters include slot No., total number of available uplink symbols for long PUCCH, number of symbols for RS and number of symbols for UCI.

TABLE 3

| Slot No. | Total number of available uplink symbols | Number of symbols for RS | Number of symbols for UCI |
| --- | --- | --- | --- |
| 1 | 7 | 2 | 5 |
| 2 | 5 | 2 | 3 |
| 3 | 4 | 1 | 3 |

As can seen from FIG. 3, the total number of uplink symbols in different slot structure may vary. Different slot combination may be considered in slot aggregation for the NR PUCCH of format 1. Table 4 shows some aggregation configuration examples of slots 202, 204 and 206 for NR PUCCH of format 1.

TABLE 4

| Index of slot aggregation configuration | Slot aggregation (value is the total number of uplink symbols of the slot and is used to indicate the slot structure in the aggregation) | Total number of uplink symbols for UCI |
| --- | --- | --- |
| 1 | 7 + 7 | 5 + 5 = 10 |
| 2 | 7 + 5 | 5 + 3 = 8 |
| 3 | 7 + 4 | 5 + 3 = 8 |
| 4 | 7 + 5 + 5 | 5 + 3 + 3 = 11 |
| 5 | 7 + 5 + 4 | 5 + 3 + 3 = 11 |
| 6 | 5 + 5 + 5 | 3 + 3 + 3 = 9 |
| 7 | 5 + 5 + 4 | 3 + 3 + 3 = 9 |
| 8 | 5 + 4 + 4 | 3 + 3 + 3 = 9 |
| 9 | 4 + 4 + 4 | 3 + 3 + 3 = 9 |

As show in Table 4, for index 1 of slot aggregation configuration, 7+7 means that two slots 302 are aggregated, and each of the two slots includes 5 symbols for UCI, and thus total number of uplink symbols for UCI is 5+5=10. For index 2 of slot aggregation configuration, 7+5 means that slot 302 and slot 304 are aggregated, and slot 302 includes 5 symbols for UCI and slot 304 includes 3 symbols for UCI, and thus total number of uplink symbols for UCI is 5+3=8. Similar description may be applied to each of the indices 2-9 of slot aggregation configuration, and thus the detailed description on the indices 3-9 of slot aggregation configuration is omitted here.

From Table 4, it can be observed that total number of uplink symbols for UCI may range from 8 to 11, which is equal to or greater than 8 as used in the PUCCH format 1/1a/1b of LTE. In other words, the slots are aggregated to support at least around 8 uplink symbols for carrying UCI, for providing at least the same or similar performance as PUCCH format 1/1a/1b for LTE. As such, the aggregation method according to the embodiment of the present disclosure can support about the same number of UCI as that in LTE PUCCH format 1/1a/1b.

It is to be noted that the aggregation configurations shown in Table 4 are only examples and actual aggregation configuration is not limited to the aggregation configurations shown in Table 4, and that more or less of slots 302-306 may aggregated in another way, as long as the total number of uplink symbols for UCI can support about enough (e.g, 8 in case of NR PUCCH of format 1) symbols for UCI.

In Tables 2 and 4, it is shown that aggregated number of UCI sometimes is up to 12. The main consideration for that is sometimes the long format PUCCH may have collision with short PUCCHs, which are transmitted at the last 1 or 2 symbols of the slot. If Time Division Multiplex (TDM) manner is used to avoid such conflict, the long PUCCH may be shortened in that slot. As a result, there will be less uplink symbols in that slot for UCI of the long format PUCCH. The total number of symbols for UCI listed in the last columns of Tables 2 and does not consider this situation and therefore more symbols may be needed to compensate this loss.

In an embodiment, the same slot aggregation configuration may include the same sets of slots aggregated in different order in time. For example, aggregation of slots 7/5/4 in time (meaning aggregation of three slots with 7/5/4 uplink symbols respectively in time) may be signaled using the same indication for aggregation of slots 7/4/5 in time as it just indicates the total aggregated symbols for UCI. The information of each slot structure in time may be obtained from other sources such as common control channel transmitted at the beginning of the slot.

In an embodiment, the slot aggregation configuration may be indicated by only the total number of aggregated symbols for UCI and the total number of aggregated slots, and may leave the slot structure of each slot to be indicated by the common control channel.

For example, the slot aggregation combinations as shown in Tables 2 and 4 may be simplified to Tables 5 and 6 respectively.

The 2nd column in Table 5 or 6 shows the slot aggregation combinations (similar to those in Table 2 or 4) and number of aggregated slot (in each of the brackets). When such configuration/indications is/are received by a UE, the UE will know how many slots may be aggregated to form a long format PUCCH and number of aggregated symbols that will carry UCI. Then, the UE may obtain structure of each slot from other source. For example, the UE may decode the common control channel of each slot to obtain the slot structure information and thus the exact number/start of PUCCH symbols in each slot.

Table 5 shows simplified slot aggregation configurations corresponding to the slot aggregation configurations in Table 2.

TABLE 5

| Index of slot aggregation configuration | Slot aggregation combinations (number of aggregated slot) | Total number of aggregated uplink symbols for UCI |
| --- | --- | --- |
| 1 | 7 + 5 (2), 5 + 4 + 4 (3) | 7 |
| 2 | 7 + 7 (2), 7 + 4 + 4 (3), 5 + 5 + 4 (3), 4 + 4 + 4 + 4 (4) | 8 |
| 3 | 7 + 5 + 4 (3), 5 + 5 + 5 (3), 5 + 4 + 4 + 4 (4) | 9 |
| 4 | 7 + 4 + 4 + 4 (4), 5 + 5 + 4 + 4 (4) | 10 |
| 5 | 7 + 5 + 4 + 4 (4) | 11 |

In the example shown in Table 5, for index 1 of slot aggregation configuration, a gNB may signal "2" in the brackets in the second column and "7" in the third column to the UE, and accordingly the UE will know that there are 2 slots will be aggregated and the total number of aggregated uplink symbols for UCI is 7. Or, a gNB may signal "3" in the brackets in the second column and "7" in the third column to the UE, and accordingly the UE will know that there are 3 slots will be aggregated and the total number of aggregated uplink symbols for UCI is 7. Then, the UE may obtain structure of each slot from other source. For example, the UE may decode the common control channel of each slot to obtain the slot structure information and thus the exact number/start of PUCCH symbols in each slot. Similar description may be applied to the indices 2-5 in Table 5, and will not be elaborated here.

Table 6 shows simplified slot aggregation configurations corresponding to the slot aggregation configurations in Table 4.

TABLE 6

| Index of Slot aggregation configuration | Slot aggregation combinations (number of aggregated slot) | Total aggregated uplink symbols for UCI |
| --- | --- | --- |
| 1 | 7 + 5 (2), 7 + 4 (2) | 8 |
| 2 | 5 + 5 + 5 (3), 5 + 5 + 4 (3), 5 + 4 + 4 (3), 4 + 4 + 4 (3) | 9 |
| 3 | 7 + 7 (2) | 10 |
| 4 | 7 + 5 + 5 (3), 7 + 5 + 4 (3) | 11 |

In the example shown in Table 6, for index 1 of slot aggregation configuration, a gNB may signal "2" in the brackets in the second column and "8" in the third column to the UE, and accordingly the UE will know that there are 2 slots will be aggregated and the total number of aggregated uplink symbols for UCI is 8. Then, the UE may obtain structure of each slot from other source. For example, the UE may decode the common control channel of each slot to obtain the slot structure information and thus the exact number/start of PUCCH symbols in each slot. It is to be noted that, for index 1 of slot aggregation configuration, the slot aggregation combination of "7+5" and the slot aggregation combination "7+4" both may be signaled from the gNB to the UE by using "2" and "8". In such as case, when slot structure information is obtained by the UE, the UE will selects one of the slot aggregation combination of "7+5" and the slot aggregation combination "7+4" to perform slot aggregation, for example, according to a predetermined selection rule which is pre-configured in the UE. Similar description may be applied to the indices 2-4 in Table 6, and will not be elaborated here.

As described above, in addition to NR PUCCH of format 1, other types of PUCCH formats also need to be supported which may carry more payload than 1-2 bits. For example, a NR PUCCH of format 2 may be defined. The NR PUCCH of format 2 may carry a payload of about 20 coded bits. The content may be Ack/Nack for multiple codewords and/or other types of UCI such as CSI. For LTE PUCCH format 1/1a/1b, 10 symbols are used to carry UCI and 4 symbols are used to carry RS. Therefore, to match that, the NR PUCCH of format 2 supports about 10 symbols for carrying UCI.

Since the NR PUCCH of format 2 supports more symbols for carrying UCI compared with the NR PUCCH of format 1, more slots, or slots with more symbols for carrying UCI may be aggregated.

Table 7 shows an example of slot aggregation combination for NR PUCCH of format 2 when the slots shown in FIG. 3 are adopted.

TABLE 7

| Index of slot aggregation configuration | Slot aggregation combination | Total number of uplink symbols for UCI |
| --- | --- | --- |
| 1 | 7 + 7 | 5 + 5 = 10 |
| 2 | 7 + 7 + 5 | 5 + 5 + 3 = 13 |
| 3 | 7 + 7 + 4 | 5 + 5 + 3 = 13 |

TABLE 7-continued

| Index of slot aggregation configuration | Slot aggregation combination | Total number of uplink symbols for UCI |
|---|---|---|
| 4 | 7 + 5 + 5 | 5 + 3 + 3 = 11 |
| 5 | 7 + 5 + 4 | 5 + 3 + 3 = 11 |
| 6 | 4 slots aggregation of 5 or 4 | 3 + 3 + 3 + 3 = 12 |

As shown in Table 7, for index 1 of slot aggregation configuration, 7+7 as shown in the second column means that two slots 302 as shown in FIG. 3 are aggregated, and each of the two slots includes 5 symbols for UCI, and thus total number of uplink symbols for UCI is 5+5=10 as shown in the third column. For index 2 of slot aggregation configuration, 7+7+5 as shown in the second column means that three slots, including two slots 302 and one slot 304 as shown in FIG. 3, are aggregated, and slot 302 includes 5 symbols for UCI and slot 304 includes 3 symbols for UCI, and thus total number of uplink symbols for UCI is 5+5+3=13 as shown in the third column. Similar description may be applied to each of the indices 2-6 of slot aggregation configuration, and detailed description on the indices 3-6 of the slot aggregation configuration is omitted here. From Table 7, it can be observed that total number of uplink symbols for UCI may range from 10 to 12, which is close to 10 as used in the PUCCH format 1/1a/1b of LTE. As such, the aggregation method according to the embodiment of the present disclosure can support about the same number of UCI as that in LTE PUCCH format 1/1a/1b.

Table 8 shows simplified slot aggregation configurations corresponding to the slot aggregation configurations in Table 7.

TABLE 8

| Index of slot aggregation configuration | Slot aggregation combination (number of aggregated slot) | Total number of aggregated uplink symbols for UCI |
|---|---|---|
| 1 | 7 + 7 (2) | 10 |
| 2 | 7 + 5 + 5 (3), 7 + 5 + 4 (3) | 11 |
| 3 | Any combination of 5 or 4 (4) | 12 |
| 4 | 7 + 7 + 5 (3), 7 + 7 + 4 (3) | 13 |

As shown in Table 8, total number of aggregated symbols for UCI as shown in the third column and number of aggregated slots as shown in the second column in brackets may be signaled to the UE while leaving the slot structure indicated to a UE by other sources such as common control channel. As the NR PUCCH of format 2 requires 10 symbols to carry, when the total number of aggregated symbols for UCI is larger than that, one or a number of the 10 symbols may be repeated in the aggregated slots, thus improve the performance.

Figure 4:
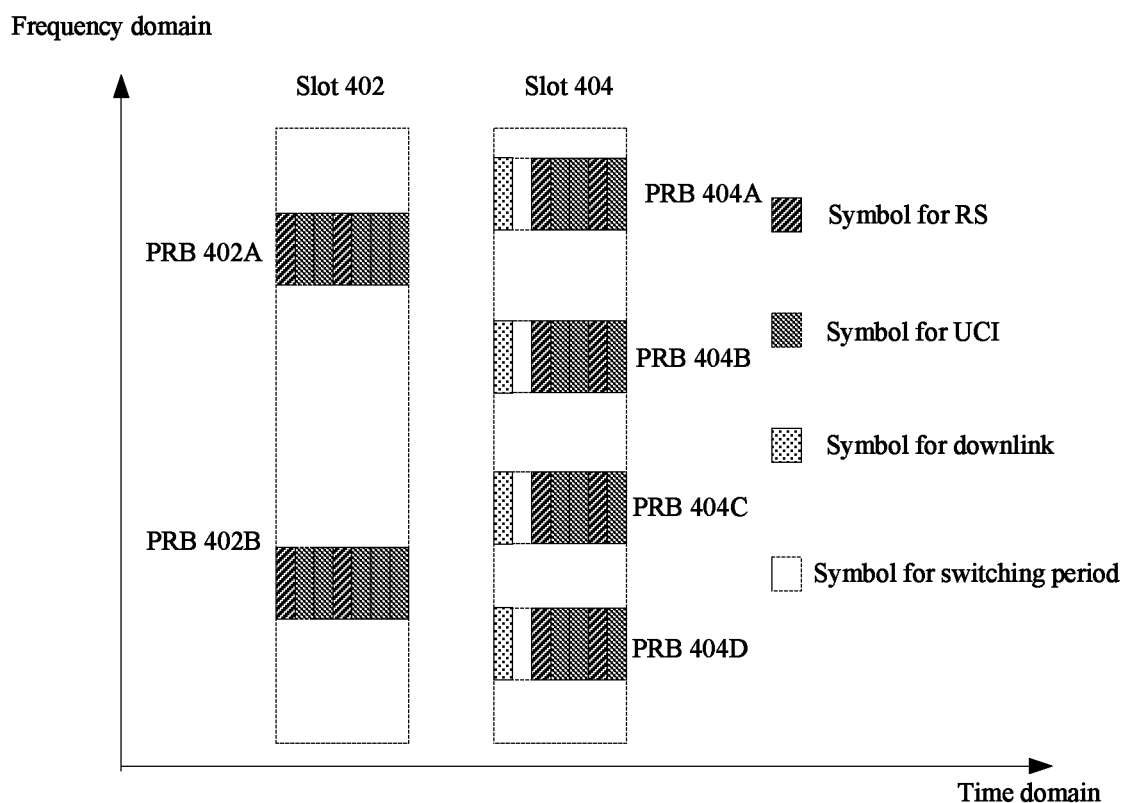
FIG. 4 is a schematic view illustrating PRBs in a single slot for carrying long format PUCCH according to an embodiment.

Aggregation of a set of slots as shown in FIG. 2 or 3 has been described above with reference to Tables 1-8. Aggregation of a set of slots may improve both time domain diversity and power boosting among slots. However, sometimes, when each slot does not contain enough uplink symbols, more slots needs to be aggregated and that may cause longer latency. One alternative is to use more resources (e.g., PRBs) in the same slot to transmit PUCCH. Aggregation of a set of PRBs in a single slot as shown in FIG. 4 will be described below. Aggregation of a set of PRBs in a single slot may not benefit from power boosting among slots, but may improve frequency domain diversity.

FIG. 4 is a schematic view illustrating PRBs in a single slot for carrying long format PUCCH according to an embodiment.

As shown in FIG. 4, slot 402 includes at least PRB 402A and PRB 402B, and slot 404 includes at least PRB 404A, PRB 404B, PRB 404C and PRB 404D. In slot 402, there are 2 symbols for carrying RS, and 5 symbols for carrying UCI. In slot 404, there are 2 symbols for RS, 3 symbols for UCI, 1 symbol for downlink and 1 symbol for switching period.

For example, the PRBs 402A and 402B are located in the same slot 402, and may be aggregated to support 10 symbols for carrying UCI, such that a long PUCCH, for example, NR PUCCH of format 1 or NR PUCCH of format 2, can be supported by the aggregated PRBs in the same slot.

Similarly, the PRBs 404A, 404B, 404C and 404D are located in the same slot 404, and two or more of the PRBs 404A, 404B, 404C and 404D may be aggregated to support enough symbols for carrying UCI. In case of NR PUCCH of format 1, for example, three PRBs (e.g., PRBs 404A, 404B and 404C) located in slot 404 may be aggregated to support 9 symbols for carrying UCI. In case of NR PUCCH of format 2, for example, four PRBs 404A, 404B, 404C and 404D located in slot 404 may be aggregated to support 12 symbols for carrying UCI.

It is to be noted that NR PUCCH of format 1 or NR PUCCH of format 2 are only examples, and similar principle may be applied to other PUCCH formats with larger payload.

It is also to be noted that the total number of PRBs to be aggregated in the same slot is not limited to the above examples, and may take other value depending on a specific long format PUCCH and the total number of symbols in a slot for carrying UCI.

Aggregation of a set of PRBs in a single slot as shown in FIG. 4 has been described above. Alternatively, aggregation of a set of PRBs across at least two slots may be performed. In other words, the formation of long format PUCCH to accommodate PUCCH format with large payloads may use resources in both time and frequency.

Figure 5:
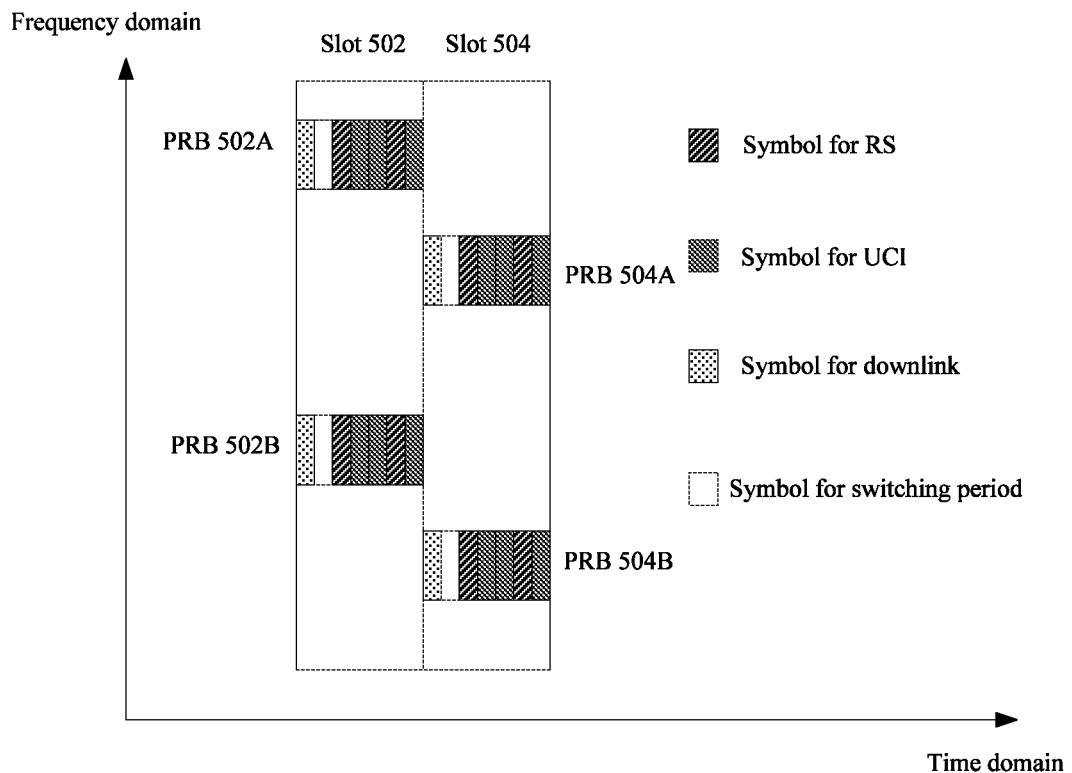
FIG. 5 is a schematic view illustrating PRBs across slots for carrying long format PUCCH according to an embodiment.

FIG. 5 is a schematic view illustrating PRBs across slots for carrying long format PUCCH according to another embodiment.

As shown in FIG. 5, slot 502 includes at least PRBs 502A and PRBs 502B, and slot 504 includes at least PRB 504A and PRB 504B. In each of slot 502 and slot 504, there are 1 symbol for downlink, 1 symbol for switching period, 2 symbols for RS, 3 symbols for UCI. In other words, slot 502 has the same structure as that of slot 504.

In case of NR PUCCH of format 1, three of PRB 502A and PRB 502B located in slot 502 and PRB 504A and PRB 504B located in slot 504 may be aggregated to support 9 symbols for carrying UCI.

In case of NR PUCCH of format 2, all of PRB 502A and PRB 502B located in slot 502 and PRB 504A and PRB 504B located in slot 504 may be aggregated to support 12 symbols for carrying UCI.

It is to be noted that NR PUCCH of format 1 or NR PUCCH of format 2 are only examples, and similar principle may be applied to other PUCCH formats with larger payload.

It is also to be noted that the total number of PRBs to be aggregated is not limited to the above examples, and may take other value depending on a specific long format PUCCH and the total number of symbols in a slot for carrying UCI.

In the example shown in FIG. 5, enough symbols may be aggregated in both time domain and frequency domain for UCI, such that time diversity, frequency diversity and other gains such as power boosting may be improved.

Figure 6:
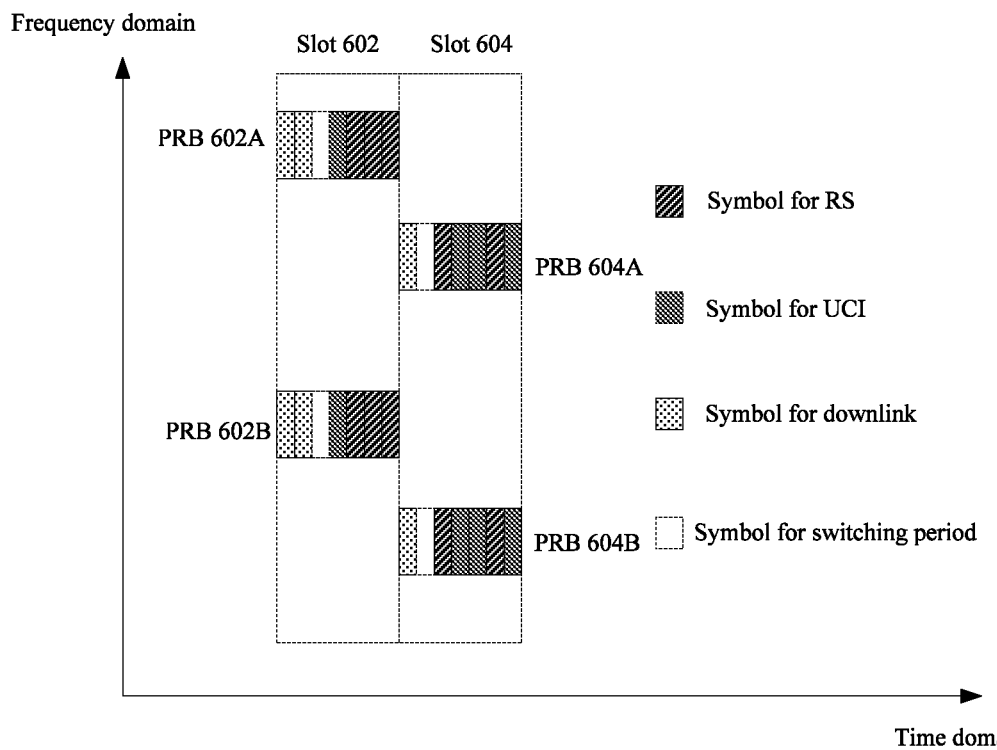
FIG. 6 is a schematic view illustrating PRBs across slots for carrying long format PUCCH according to another embodiment.

FIG. 6 is a schematic view illustrating PRBs across slots for carrying long format PUCCH according to another embodiment. The embodiment shown in FIG. 6 differs from the embodiment in FIG. 5 in that structure of slot 602 is different from structure of slot 604, while structure of slot 502 is the same as the structure of slot 504.

Two or more of PRBs 602A and 602B located in slot 602 and PRBs 604A and 604B may be aggregated to support long format PUCCH such as NR PUCCH of format 1 or NR PUCCH of format 2.

Figure 7:
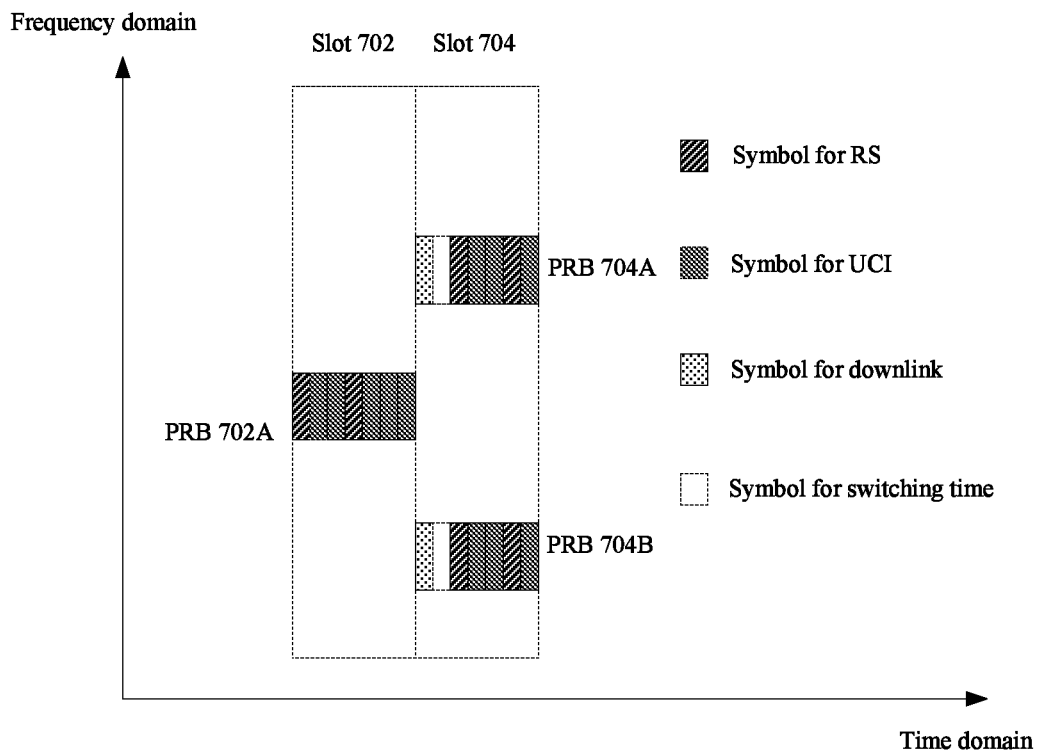
FIG. 7 is a schematic view illustrating PRBs across slots for carrying long format PUCCH according to yet another embodiment.

FIG. 7 is a schematic view illustrating PRBs across slots for carrying long format PUCCH according to another embodiment.

The embodiment shown in FIG. 7 differs from the embodiment in FIG. 6 in that only one PRB 702B is shown in slot 702. In other words, FIG. 7 illustrates an extreme case where one PRB 702A is allocated to long format PUCCH with 7 symbols in one slot 702, which is followed by two PRBs allocated for long format PUCCH with 5 symbols in the next slot 704. Together they are used to form the resources for support for example one NR PUCCH of format 2. In such a case, the UE may allocate the same level of power to each PRB in each slot even the total number of PRBs allocated in each slot are not the same. This will guarantee the similar coverage for UCI.

Since either of FIGS. 6 and 7 is similar to FIG. 5, only differences are described above, and detailed description are omitted here.

The aggregation method carried out in the gNB side has been described with reference to FIGS. 1-7. Now the aggregation method carried out in the UE side will be described below with reference to FIG. 8.

Figure 8A:
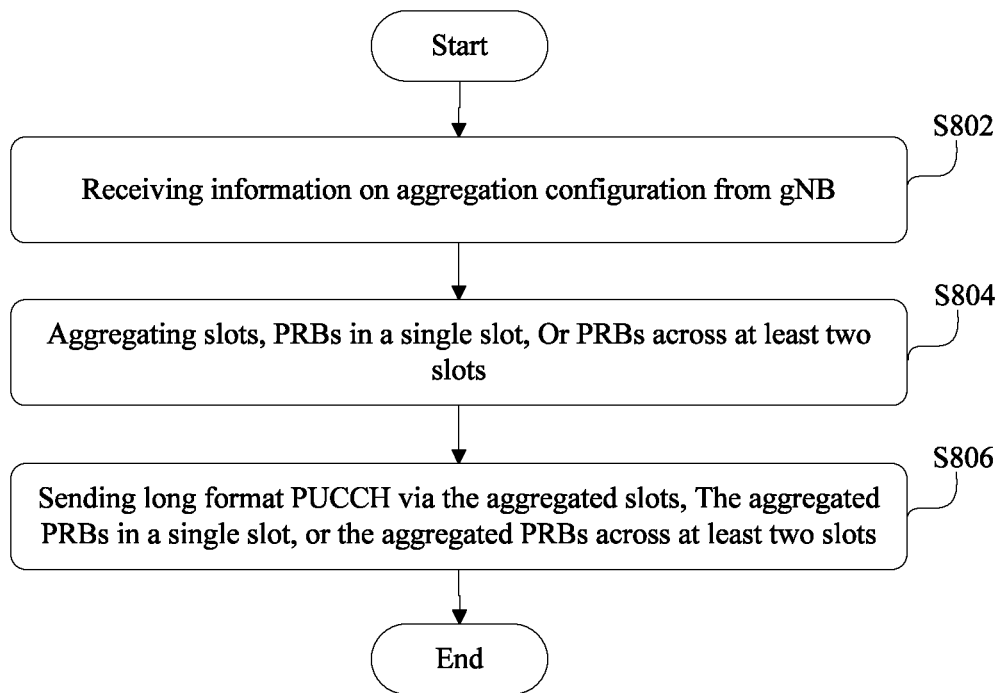
FIG. 8A is a flow chart illustrating an aggregation method carried out in a UE according to an embodiment of the present disclosure.

FIG. 8 is a flow chart illustrating an aggregation method carried out in a UE according to an embodiment of the present disclosure. As shown in FIG. 8, the aggregation method carried out in the UE includes the following operations.

In block S802, a UE receives information on at least part of aggregation configuration of one of a set of slots, a set of PRBs in a single slot, and a set of PRBs across at least two slots from a gNB.

In block S804, the UE aggregates the one of the set of slots, the set of PRBs in a single slot, and the set of PRBs across at least two slots according to the aggregation configuration.

In block S806, the UE sends a long format PUCCH to the gNB via the aggregated one of the set of slots, the set of PRBs in a single slot, and set of PRBs across at least two slots.

When the long format PUCCH supports 1 PRB×N symbols time-frequency resources for carrying UCI, one of the set of slots, the set of PRBs in a single slot, and the a set of PRBs across at least two slots may be aggregated to support about 1 PRB×N symbols time-frequency resources for carrying UCI, where N is a positive integer.

When a set of slots is aggregated for carrying the long format PUCCH, in block S802, the UE may receive information of at least one of the total number of slots to be aggregated, structure of each slot to be aggregated, and total number of symbols to be aggregated for carrying UCI from the gNB.

In an embodiment, the UE may receive the total number of slots to be aggregated and the total number of symbols to be aggregated for carrying UCI, and then the UE may receive the structure of each slot to be aggregated via a common control channel from the gNB.

Figure 8B:
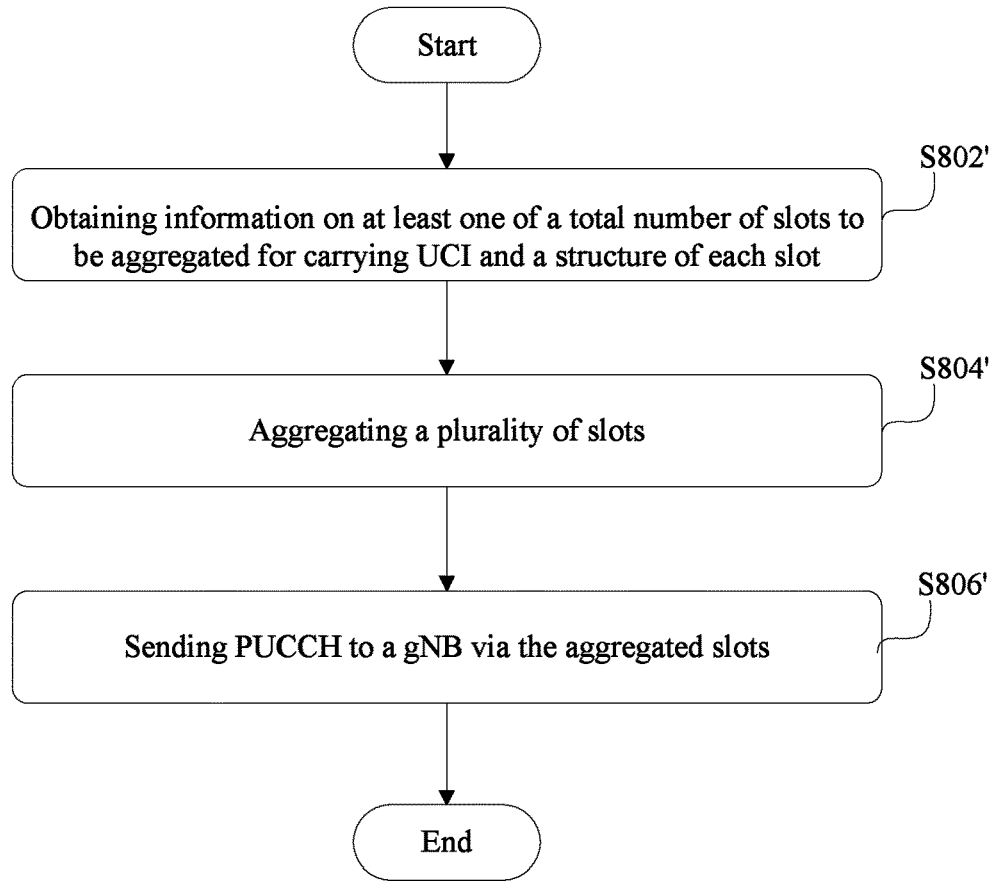
FIG. 8B is a flow chart illustrating an aggregation method carried out in a UE according to another embodiment of the present disclosure.

In another embodiment, the UE may receive the total number of slots to be aggregated and the structure of each slot to be aggregated. FIG. 8B is a flow chart illustrating an aggregation method carried out in a UE according to another embodiment of the present disclosure in case where the UE may receive the total number of slots to be aggregated and the structure of each slot to be aggregated.

As illustrated in FIG. 8B, the aggregation method may include the following operations In block S802', the UE may obtain information on at least one of: a total number of slots to be aggregated for carrying UCI, and a structure of each slot.

In block S804', the UE may aggregate a plurality of slots according to the information on the at least one of the total number of slots to be aggregated and the structure of each slot.

In block S806', the UE may sends PUCCH to a gNB via the aggregated slots.

In the embodiment, the UE may further obtain information on the first slot of the slots to be aggregated. In such case, the UE may aggregate a plurality of slots according to the information on the at least one of the total number of slots to be aggregated, the structure of each slot, and the information on the first slot of the slots to be aggregated.

In an embodiment, the UE may obtain the total number of slots to be aggregated from a gNB.

In an embodiment, the UE may obtain the structure of each slot to be aggregated from a gNB. Alternatively, in an embodiment, the UE may obtain the structure of each slot to be aggregated according to a protocol.

In an embodiment, the plurality of slots are aggregated by aggregating one or more PRBs of each slot. In an embodiment, the one or more PRBs are positioned in a same manner in the slots. Alternatively, in an embodiment, the one or more PRBs are positioned in different manners in the slots.

In an embodiment, the PUCCH is long format PUCCH. In an embodiment, when the long format PUCCH supports 1 PRB×N symbols time-frequency resources for carrying UCI, the plurality of slots are aggregated to support about 1 PRB×N symbols time-frequency resources for carrying UCI, where N is a positive integer.

When a set of PRBs in a single slot is aggregated for carrying the long format PUCCH, in block S802, the UE may receive information of at least one of the total number of PRBs to be aggregated in the single slot, location of each of PRBs to be aggregated in the single slot, and total number of symbols to be aggregated for carrying UCI from the gNB.

When a set of PRBs across at least two slots is aggregated for carrying the long format PUCCH, in block S802, the UE may receive information of at least one of the total number of slots to be aggregated, structure of each slot to be aggregated, the total number of PRBs to be aggregated in each slot, location of each of PRBs to be aggregated in each slot, and total number of symbols to be aggregated for carrying UCI from the gNB.

In an embodiment, the UE may receive an index of a look-up table, wherein the look-up table is pre-configured in the UE or sent to the UE via signaling of a higher layer and contains aggregation configurations and their respective indices from the gNB. In such a case, before block S804, the UE may retrieve aggregation configuration from the look-up table according to the index received from the gNB.

In an embodiment, in block S802, the UE may receive information on at least part of aggregation configuration of one of a set of slots, a set of PRBs in a single slot, and a set of PRBs across at least two slots from the gNB dynamically via lower layer signaling, semi-statically via combination of higher layer signaling, or via a combination of lower layer signaling and higher layer signaling.

Since details of the aggregation method have been described with reference to FIGS. 1-7, details descriptions of the aggregation method carried out in the UE are omitted here. Where appropriate, the same or similar descriptions made with reference to FIGS. 1-7 may also apply to the embodiment of FIG. 8.

Figure 9:
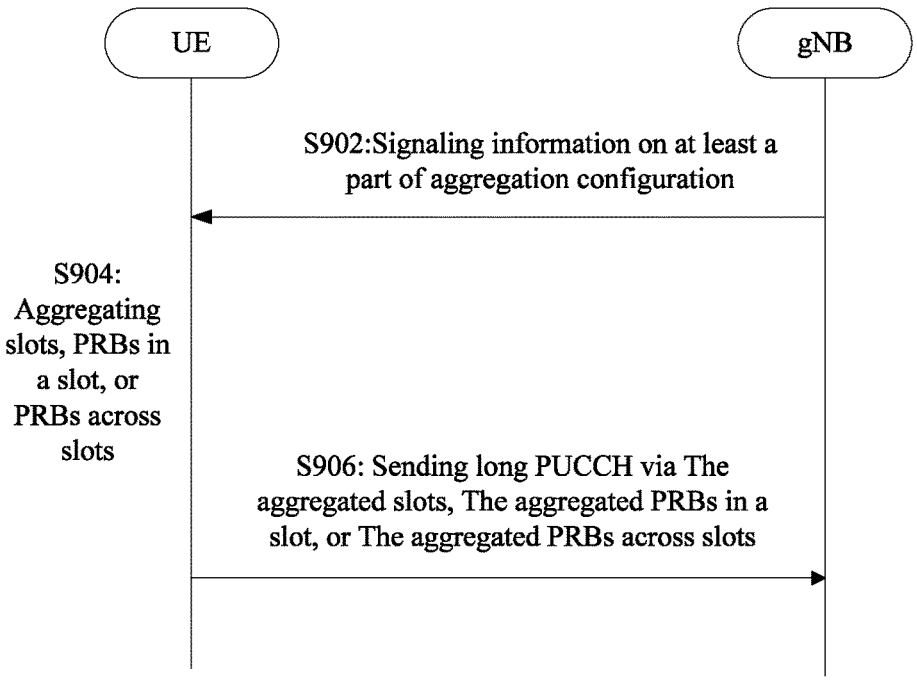
FIG. 9 is a flow chart illustrating a procedure of an aggregation method carried out in a gNB and a UE, which interact with each other, according to an embodiment of the present disclosure.

FIG. 9 is a flow chart illustrating a procedure of an aggregation method carried out in a gNB and a UE, which interact with each other, according to an embodiment of the present disclosure.

As shown in FIG. 9, the aggregation method is carried out in a gNB and a UE, which interact with each other. The aggregation method includes the following operations.

In block S902, the gNB signals information on at least part of aggregation configuration of one of a set of slots, a set of PRBs in a single slot, and a set of PRBs across at least two slots to a UE.

In block S904, the UE aggregates the one of the set of slots, the set of PRBs in a single slot, and the set of PRBs across at least two slots according to the aggregation configuration.

In block S906, the UE sends a long format PUCCH to the gNB via the aggregated one of the set of slots, the set of PRBs in a single slot, and set of PRBs across at least two slots.

Since details of the aggregation method carried out in a gNB have been described with reference to FIGS. 1-7, and details of the aggregation method carried out in a UE have been described with reference to FIG. 8, the details descriptions of the aggregation method of FIG. 9 are omitted here. Where appropriate, the same or similar descriptions made with reference to FIGS. 1-8 may also apply to the embodiment of FIG. 9.

Figure 10:
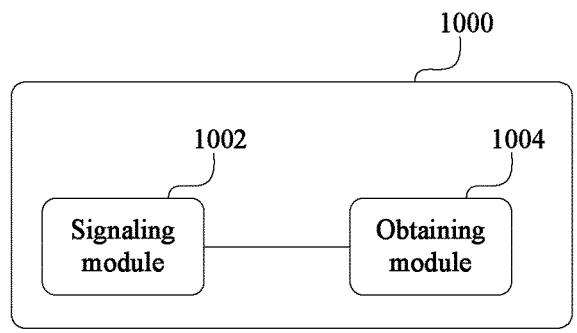
FIG. 10 is a block diagram illustrating configuration of a gNB according to an embodiment of the present disclosure.

FIG. 10 is a block diagram illustrating configuration of a gNB 1000 according to an embodiment of the present disclosure.

As show in FIG. 10, the gNB 1000 includes a signaling module 1002 and an obtaining module 1004.

The signaling module 1002 may be configured to signal information on at least part of aggregation configuration of one of a set of slots, a set of PRBs in a single slot, and a set of PRBs across at least two slots to a UE.

The obtaining module 1004 may be configured to receive a long format PUCCH carried in the one of the set of slots, the set of PRBs in a single slot, and the set of PRBs across at least two slots, which is aggregated according to the aggregation configuration, from the UE.

The signaling module 1002 and the obtaining module 1004 both may be implemented by at least one processor in the gNB. The processor may be Central Processing Unit (CPU), a Microprocessor Unit (MPU), a Digital Signal Processor (DSP) or a Field Programmable Gate Array (FPGA).

When the long format PUCCH supports 1 PRB×N symbols time-frequency resources for carrying UCI, the one of the set of slots, the set of PRBs in a single slot, and the set of PRBs across at least two slots may be aggregated to support about 1 PRB×N symbols time-frequency resources for carrying UCI, where N is a positive integer.

When a set of slots is aggregated for carrying the long format PUCCH, the signaling module 1002 may be configured to signal information of at least one of the total number of slots to be aggregated, structure of each slot to be aggregated, and total number of symbols to be aggregated for carrying UCI to the UE.

In an embodiment, the signaling module 1002 may be configured to signal information on at least one of: a total number of slots to be aggregated for carrying UCI, and a structure of each slot to UE.

In an embodiment, the obtaining module 1004 may be configured to receive PUCCH from the UE via a plurality of slots aggregated according to the information on the at least one of the total number of slots to be aggregated and the structure of each slot.

In an embodiment, the signaling module 1002 may be further configured to signal information on the first slot of the slots to be aggregated. In an embodiment, the obtaining module 1004 may be configured to receiving PUCCH from the UE via a plurality of slots which are aggregated according to the information on the at least one of the total number of slots to be aggregated, the structure of each slot, and the information on the first slot of the slots to be aggregated.

In an embodiment, the obtaining module 1004 may be configured to receive PUCCH from the UE via aggregated slots which are aggregated by aggregating a plurality of slots by aggregating one or more PRBs of each slot. In an embodiment, the one or more PRBs may be positioned in a same manner in the slots. Alternatively, in an embodiment, the one or more PRBs may be positioned in different manners in the slots.

In an embodiment, the PUCCH is long format PUCCH. Alternatively, the PUCCH may be not long format PUCCH.

In an embodiment, when the long format PUCCH supports 1 PRB×N symbols time-frequency resources for carrying UCI, the plurality of slots are aggregated to support about 1 PRB×N symbols time-frequency resources for carrying UCI, where N is a positive integer.

In an embodiment, the signaling module 1002 may be configured to signal the total number of slots to be aggregated and the total number of symbols to be aggregated for carrying UCI to the UE. In such a case, the structure of each slot to be aggregated is signaled to the UE via a common control channel.

When a set of PRBs in a single slot is aggregated for carrying the long format PUCCH, the signaling module 1002 may be configured to signal information of at least one of the total number of PRBs to be aggregated in the single slot, location of each of PRBs to be aggregated in the single slot, and total number of symbols to be aggregated for carrying UCI to the UE.

When a set of PRBs across at least two slots is aggregated for carrying the long format PUCCH, the signaling module 1002 may be configured to signal information of at least one of the total number of slots to be aggregated, structure of each slot to be aggregated, the total number of PRBs to be aggregated in each slot, location of each of PRBs to be aggregated in each slot, and total number of symbols to be aggregated for carrying UCI to the UE.

In an embodiment, the signaling module 1002 may be configured to signal an index of a look-up table to the UE, wherein the look-up table is pre-configured in the UE or sent to the UE via signaling of a higher layer and contains aggregation configurations and their respective indices.

In an embodiment, the signaling module 1002 may be configured to signal information on at least part of aggregation configuration of one of a set of slots, a set of PRBs in a single slot, and a set of PRBs across at least two slots to a UE dynamically via lower layer signaling, semi-statically via combination of higher layer signaling, or via a combination of lower layer signaling and higher layer signaling.

Since details of the aggregation method have been described with reference to FIGS. 1-7, details descriptions of the gNB are omitted here. Where appropriate, the same or similar descriptions made with reference to FIGS. 1-7 may also apply to the embodiment of FIG. 10.

Figure 11:
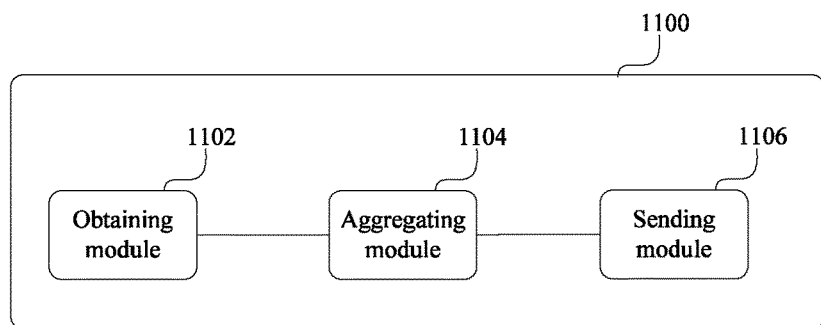
FIG. 11 is a block diagram illustrating configuration of a UE according to embodiment of the present disclosure.

FIG. 11 is a block diagram illustrating configuration of a UE 1100 according to embodiment of the present disclosure.

As shown in FIG. 11, the UE 1100 includes an obtaining module 1102, an aggregation module 1104 and a sending module 1106.

The obtaining module 1102 may be configured to receive information on at least part of aggregation configuration of one of a set of slots, a set of PRBs in a single slot, and a set of PRBs across at least two slots from a gNB.

The aggregation module 1104 may be configured to aggregate the one of the set of slots, the set of PRBs in a single slot, and the set of PRBs across at least two slots according to the aggregation configuration.

The obtaining module 1102, aggregation module 1104 and sending module 1106 may be implemented by at least one processor in the UE. The processor may be Central Processing Unit (CPU), a Microprocessor Unit (MPU), a Digital Signal Processor (DSP) or a Field Programmable Gate Array (FPGA).

The sending module 1106 may be configured to send a long format PUCCH to the gNB via the aggregated one of the set of slots, the set of PRBs in a single slot, and set of PRBs across at least two slots.

When the long format PUCCH supports 1 PRB×N symbols time-frequency resources for carrying UCI, one of the set of slots, the set of PRBs in a single slot, and the a set of PRBs across at least two slots may be aggregated to support about 1 PRB×N symbols time-frequency resources for carrying UCI, where N is a positive integer.

When a set of slots is aggregated for carrying the long format PUCCH, the obtaining module 1102 may be configured to receive information of at least one of the total number of slots to be aggregated, structure of each slot to be aggregated, and total number of symbols to be aggregated for carrying UCI from the gNB.

In an embodiment, the obtaining module 1102 may be configured to receive the total number of slots to be aggregated and the total number of symbols to be aggregated for carrying UCI; and receive the structure of each slot to be aggregated via a common control channel from the gNB.

In an embodiment, the obtaining module 1102 may be configured to obtain information on at least one of a total number of slots to be aggregated for carrying UCI, and a structure of each slot. In such case, the aggregating module 1104 may be configured to aggregate a plurality of slots according to the information on the at least one of the total number of slots to be aggregated and the structure of each slot. Accordingly, the sending module 1106 may be configured to send PUCCH to a gNB via the aggregated slots.

In an embodiment, the obtaining module 1102 may be further configured to obtain information on the first slot of the slots to be aggregated. In such case, the aggregating module 1104 may be configured to aggregate a plurality of slots according to the information on the at least one of the total number of slots to be aggregated, the structure of each slot, and the information on the first slot of the slots to be aggregated.

In an embodiment, the obtaining module 1102 may be configured to obtain the total number of slots to be aggregated from a gNB.

In an embodiment, the obtaining module 1102 may be configured to obtain the structure of each slot to be aggregated from a gNB. Alternatively, in an embodiment, the obtaining module 1102 may be configured to obtain the structure of each slot to be aggregated according to a protocol.

In an embodiment, the aggregating module 1104 may be configured to aggregate a plurality of slots by aggregating one or more PRBs of each slot, the one or more PRBs being positioned in a same manner in the slots.

In an embodiment, the aggregating module 1104 may be configured to aggregate a plurality of slots by aggregating one or more PRBs of each slot, the one or more PRBs being positioned in different manners in the slots.

In an embodiment, the PUCCH may be long format PUCCH. Alternatively, the PUCCH may be not long format PUCCH.

When a set of PRBs in a single slot is aggregated for carrying the long format PUCCH, the obtaining module 1102 may be configured to receive information of at least one of the total number of PRBs to be aggregated in the single slot, location of each of PRBs to be aggregated in the single slot, and total number of symbols to be aggregated for carrying UCI from the gNB.

When a set of PRBs across at least two slots is aggregated for carrying the long format PUCCH, the obtaining module 1102 may be configured to receive information of at least one of the total number of slots to be aggregated, structure of each slot to be aggregated, the total number of PRBs to be aggregated in each slot, location of each of PRBs to be aggregated in each slot, and total number of symbols to be aggregated for carrying UCI from the gNB.

In an embodiment, the obtaining module 1102 may be configured to receive an index of a look-up table, wherein the look-up table is pre-configured in the UE or sent to the UE via signaling of a higher layer and contains aggregation configurations and their respective indices from the gNB. The obtaining module 1102 may be further configured retrieve aggregation configuration from the look-up table according to the index received from the gNB.

In an embodiment, the obtaining module 1102 may be configured to receive information on at least part of aggregation configuration of one of a set of slots, a set of PRBs in a single slot, and a set of PRBs across at least two slots from the gNB dynamically via lower layer signaling, semi-statically via combination of higher layer signaling, or via a combination of lower layer signaling and higher layer signaling.

Since details of the aggregation method have been described with reference to FIGS. 1-8, details descriptions of the UE are omitted here. Where appropriate, the same or similar descriptions made with reference to FIGS. 1-8 may also apply to the embodiment of FIG. 11.

Figure 12:
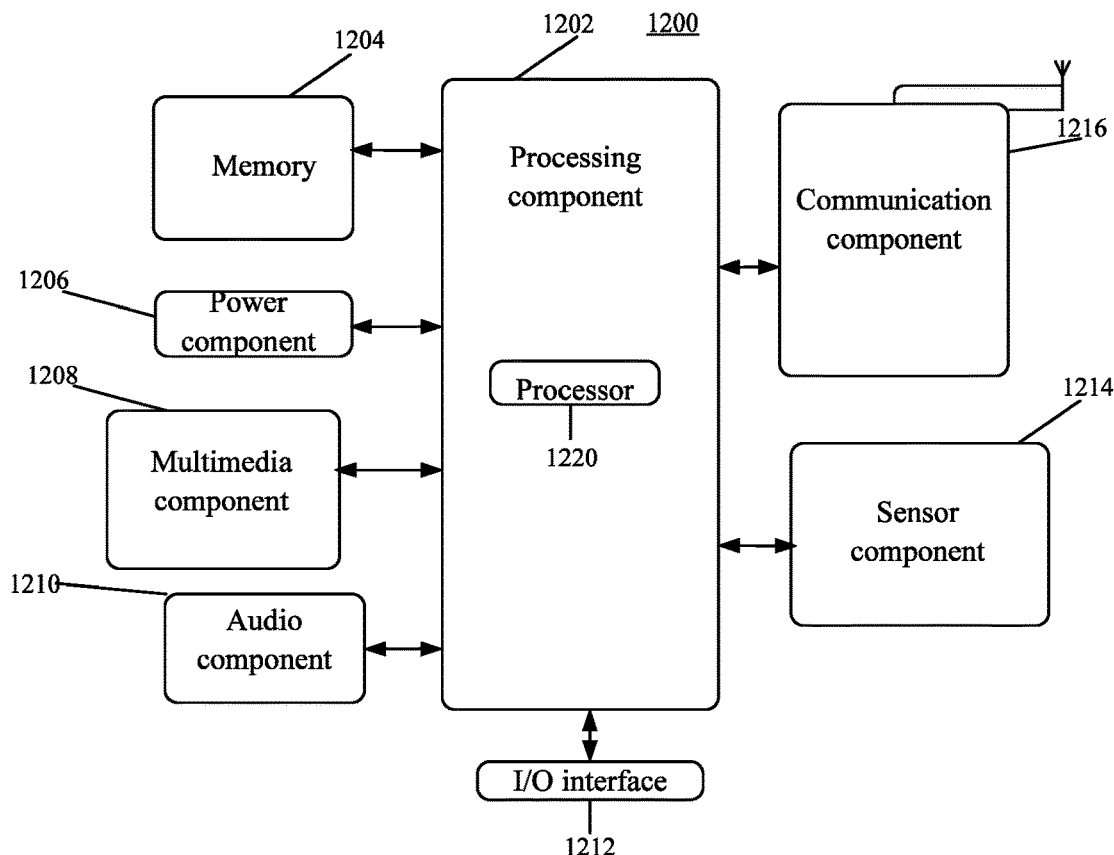
FIG. 12 is a schematic diagram illustrating structure of a UE according to an exemplary embodiment.

FIG. 12 is a schematic diagram illustrating structure of a UE according to an exemplary embodiment.

As shown in FIG. 12, the UE 1200 may be a mobile phone, a computer, a digital broadcast terminal, a messaging device, a tablet, a personal digital assistant or the like.

The device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the operations in the abovementioned method. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

The memory 1204 is configured to store various types of data to support the operation of the device 1200. Examples of such data include instructions for any application programs or methods operated on the device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 provides power for various components of the device 1200. The power component 1206 may include a power management system, one or more power supplies, and other components associated with the generation, management and distribution of power for the device 1200.

The multimedia component 1208 includes a screen providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may be further stored in the memory 1204 or sent through the communication component 1216. In some embodiments, the audio component 1210 further includes a speaker configured to output the audio signal.

The I/O interface 1212 provides an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 includes one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (Wi-Fi) network, a 2nd-Generation (2G), 3rd-Generation (3G) or 4th-Generation (4G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1204 including an instruction, and the instruction may be executed by the processor 1220 of the device 1200 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an exemplary embodiment, there is also provided a non-transitory computer-readable storage medium having stored thereon instructions, that when executed by a processor of a gNB, cause the processor to perform the aggregation method as described with reference to FIGS. 1-8.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An aggregation method, comprising:
obtaining, by a user equipment (UE), information of: a total number of slots to be aggregated for carrying uplink control information (UCI), and a structure of each slot, the each slot comprising one or more physical resource blocks (PRBs);
aggregating, by the UE, a plurality of slots according to the information of the total number of slots to be aggregated and the structure of each slot, comprising:
aggregating the plurality of slots by aggregating one or more PRBs of each of the plurality of slots; and
sending, by the UE, physical uplink control channel (PUCCH) to a gNodeB (gNB) via the aggregated slots.

2. The aggregation method according to claim 1, further comprising:
obtaining, by the UE, information on the first slot of the slots to be aggregated,
wherein the aggregating, by the UE, a plurality of slots according to the information of the total number of slots to be aggregated and the structure of each slot comprises: aggregating, by the UE, a plurality of slots according to the information of the total number of slots to be aggregated, the structure of each slot, and the information on the first slot of the slots to be aggregated.

3. The aggregation method according to claim 1, wherein the obtaining, by a UE, information of: a total number of slots to be aggregated for carrying UCI and a structure of each slot comprises:
obtaining, by the UE, the total number of slots to be aggregated from a gNodeB (gNB).

4. The aggregation method according to claim 1, wherein the obtaining, by a UE, information of a total number of slots to be aggregated and a structure of each slot to be aggregated for carrying UCI comprises:
obtaining, by the UE, the structure of each slot to be aggregated from a gNB; or
obtaining, by the UE, the structure of each slot to be aggregated according to a protocol.

5. The aggregation method according to claim 1, wherein the one or more PRBs being positioned in a same manner in the slots, or
the one or more PRBs being positioned in different manners in the slots.

6. The aggregation method according to claim 1, wherein the PUCCH is long format PUCCH.

7. The method according to claim 6, wherein the long format PUCCH is a new radio (NR) PUCCH of format 1.

8. An aggregation method, comprising:
signaling, by a gNodeB (gNB), information of: a total number of slots to be aggregated for carrying uplink control information (UCI), and a structure of each slot to a user equipment (UE), the each slot comprising one or more physical resource blocks (PRBs); and
receiving, by the gNB, physical uplink control channel (PUCCH) from the UE via a plurality of slots aggregated according to the information of the total number of slots to be aggregated and the structure of each slot, comprising:
receiving, by the gNB, PUCCH from the UE via aggregated slots which are aggregated by aggregating the plurality of slots by aggregating one or more PRBs of each of the plurality of slots.

9. The aggregation method according to claim 8, further comprising:
signaling, by the gNB, information on the first slot of the slots to be aggregated,
wherein the plurality of slots are aggregated according to the information one of the total number of slots to be aggregated, the structure of each slot, and the information on the first slot of the slots to be aggregated.

10. The aggregation method according to claim 8, wherein
the one or more PRBs being positioned in a same manner in the slots, or
the one or more PRBs being positioned in different manners in the slots.

11. The aggregation method according to claim 8, wherein the PUCCH is long format PUCCH.

12. A user equipment (UE), comprising:
a transceiver configured to obtain information of a total number of slots to be aggregated for carrying uplink control information (UCI), and a structure of each slot, the each slot comprising one or more physical resource blocks (PRBs); and
a processor configured to aggregate a plurality of slots according to the information of the total number of slots to be aggregated and the structure of each slot,
the transceiver is further configured to send physical uplink control channel (PUCCH) to a gNodeB (gNB) via the aggregated slots;
wherein the processor is further configured to: aggregate the plurality of slots by aggregating one or more PRBs of each of the plurality of slots.

13. The UE according to claim 12, wherein the transceiver is further configured to obtain information on the first slot of the slots to be aggregated, and wherein the processor is configured to aggregate a plurality of slots according to the information of the total number of slots to be aggregated, the structure of each slot, and the information on the first slot of the slots to be aggregated.

14. The UE according to claim 12, wherein the transceiver is configured to:
obtain the total number of slots to be aggregated from a gNodeB (gNB).

15. The UE according to claim 12, wherein the transceiver is configured to:
obtain the structure of each slot to be aggregated from a gNB; or
obtain the structure of each slot to be aggregated according to a protocol.

16. The UE according to claim 12, wherein
the one or more PRBs being positioned in a same manner in the slots, or
the one or more PRBs being positioned in different manners in the slots.

17. The UE according to claim 12, wherein the PUCCH is long format PUCCH.

18. The UE according to claim 17, wherein the long format PUCCH is a new radio (NR) PUCCH of format 1.

19. A gNodeB (gNB), comprising:

a transceiver, configured to:

signal information of: a total number of slots to be aggregated for carrying uplink control information (UCI), and a structure of each slot to a user equipment (UE), the each slot comprising one or more physical resource blocks (PRBs); and receive physical uplink control channel (PUCCH) from the UE via a plurality of slots aggregated according to the information of the total number of slots to be aggregated and the structure of each slot;

wherein the transceiver is further configured to:

receive the PUCCH from the UE via aggregated slots which are aggregated by aggregating the plurality of slots by aggregating one or more PRBs of each of the plurality of slots.

20. The gNB according to claim 19, wherein the transceiver is further configured to signal information on the first slot of the slots to be aggregated, and to receive PUCCH from the UE via a plurality of slots which are aggregated according to the information of the total number of slots to be aggregated, the structure of each slot, and the information on the first slot of the slots to be aggregated.

21. The gNB according to claim 19, wherein the one or more PRBs being positioned in a same manner in the slots, or the one or more PRBs being positioned in different manners in the slots.

22. The gNB according to claim 19, wherein the PUCCH is long format PUCCH.

\* \* \* \* \*